United States Patent
Ette et al.

(10) Patent No.: US 9,797,998 B2
(45) Date of Patent: Oct. 24, 2017

(54) METHOD FOR DETERMINING A POSITION OF A RECEIVER AND POSITIONING SYSTEM FOR A RECEIVER

(71) Applicant: Volkswagen Aktiengesellschaft, Wolfsburg (DE)

(72) Inventors: Bernd Ette, Wolfsburg (DE); Bernhard Holldack, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 414 days.

(21) Appl. No.: 14/635,578

(22) Filed: Mar. 2, 2015

(65) Prior Publication Data
US 2015/0168544 A1    Jun. 18, 2015

Related U.S. Application Data

(63) Continuation of application No. PCT/EP2013/067969, filed on Aug. 30, 2013.

(30) Foreign Application Priority Data

Sep. 1, 2012   (DE) .................. 10 2012 017 387

(51) Int. Cl.
*G01S 5/04*   (2006.01)
*G01S 11/06*   (2006.01)
(Continued)

(52) U.S. Cl.
CPC ............... *G01S 11/06* (2013.01); *G01S 5/10* (2013.01); *G07C 9/00174* (2013.01); *G07C 2209/63* (2013.01)

(58) Field of Classification Search
CPC ..... G01S 5/04; G01S 5/10; G01S 11/06; G07C 9/00174
USPC .......................................................... 342/442
See application file for complete search history.

(56) References Cited

U.S. PATENT DOCUMENTS 3,959,889 A    6/1976  Thomas
5,040,892 A *  8/1991  Bjorkman ............... G01S 3/789
                                                        250/203.3
(Continued)

FOREIGN PATENT DOCUMENTS

CN    1763559 A    4/2006
CN    102602363 A  7/2012
(Continued)

OTHER PUBLICATIONS

Chinese Search Report for Chinese Application No. 201380057632.5 dated Mar. 24, 2016—English translation.

*Primary Examiner* — Harry Liu
(74) *Attorney, Agent, or Firm* — Muncy, Geissler, Olds & Lowe, P.C.

(57) ABSTRACT

A method for determining a position of a receiver is provided. The method includes the emission of at least one electromagnetic field by a respective transmitter, an amplitude of the at least one electromagnetic field rotating respectively with respect to the respective transmitter. The method includes the measurement of the at least one electromagnetic field by the receiver and the determination of a differential phase. The method further includes the determination of the position based on the at least one differential phase.

16 Claims, 16 Drawing Sheets

(51) Int. Cl.
*G01S 5/10* (2006.01)
*G07C 9/00* (2006.01)

(56) References Cited

U.S. PATENT DOCUMENTS

| | | |
|---|---|---|
| 5,307,072 A | 4/1994 | Jones, Jr. |
| 5,347,289 A | 9/1994 | Elhardt |
| 5,425,367 A | 6/1995 | Shapiro et al. |
| 6,148,195 A * | 11/2000 | Schuchman ............. G01S 3/16 |
| | | 455/424 |
| 6,963,301 B2 | 11/2005 | Schantz et al. |
| 7,301,467 B2 | 11/2007 | Ishimura et al. |
| 2004/0215382 A1 | 10/2004 | Breed et al. |
| 2006/0208169 A1 | 9/2006 | Breed et al. |
| 2007/0126561 A1 | 6/2007 | Breed |
| 2008/0303714 A1* | 12/2008 | Ezal .................... G01C 21/005 |
| | | 342/357.22 |
| 2009/0096443 A1 | 4/2009 | Anderson |

FOREIGN PATENT DOCUMENTS

| | | |
|---|---|---|
| DE | 693 20 274 T2 | 4/1999 |
| DE | 198 09 058 A1 | 9/1999 |
| DE | 603 16 818 T2 | 2/2008 |
| DE | 10 2007 042 370 A1 | 5/2008 |
| EP | 0 581 434 A1 | 2/1994 |
| JP | H 06-221805 A | 8/1994 |
| JP | 2006-118148 A | 5/2006 |
| WO | WO 95/01545 A1 | 1/1995 |
| WO | WO 2006/054295 A1 | 5/2006 |

* cited by examiner

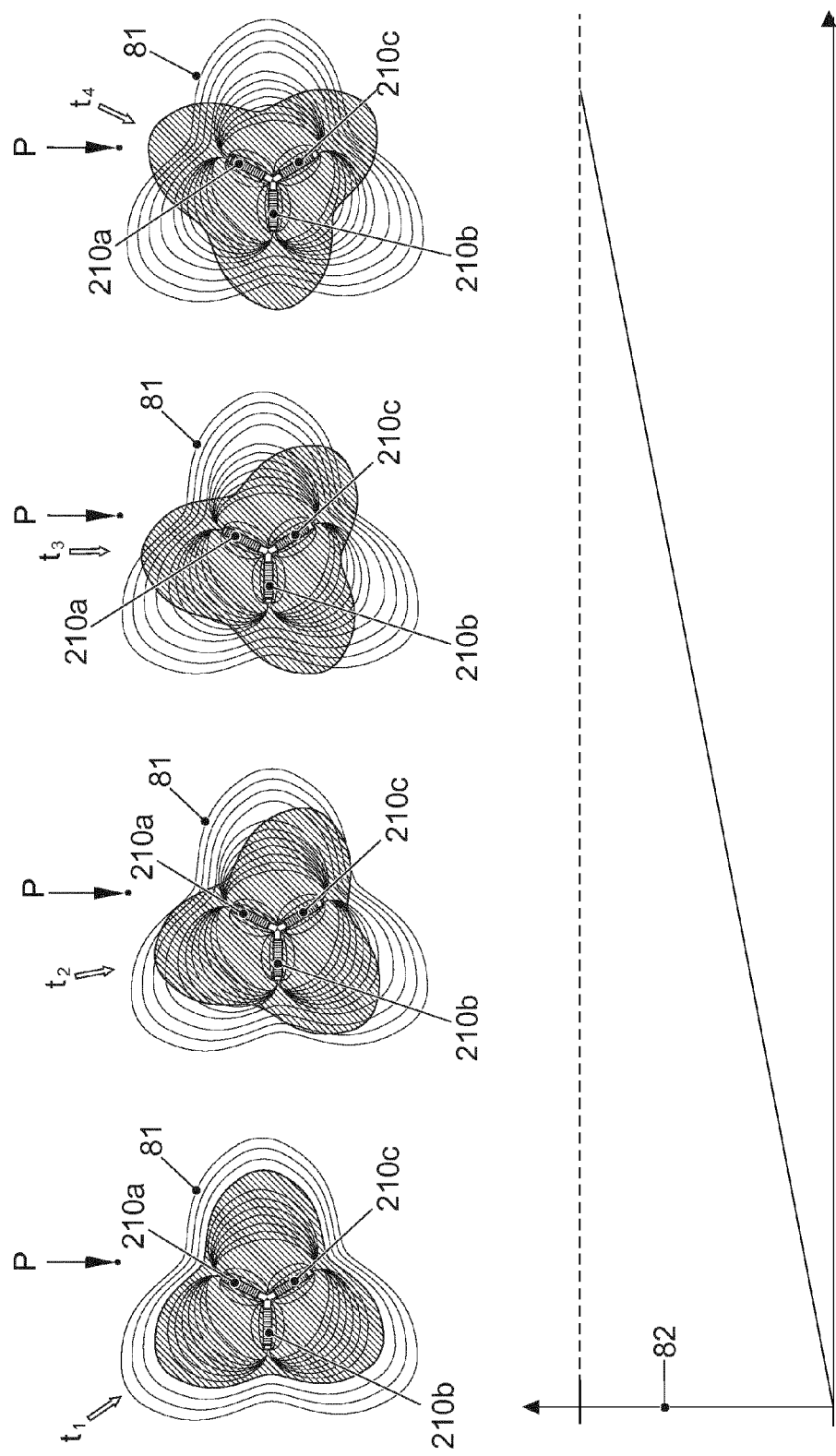

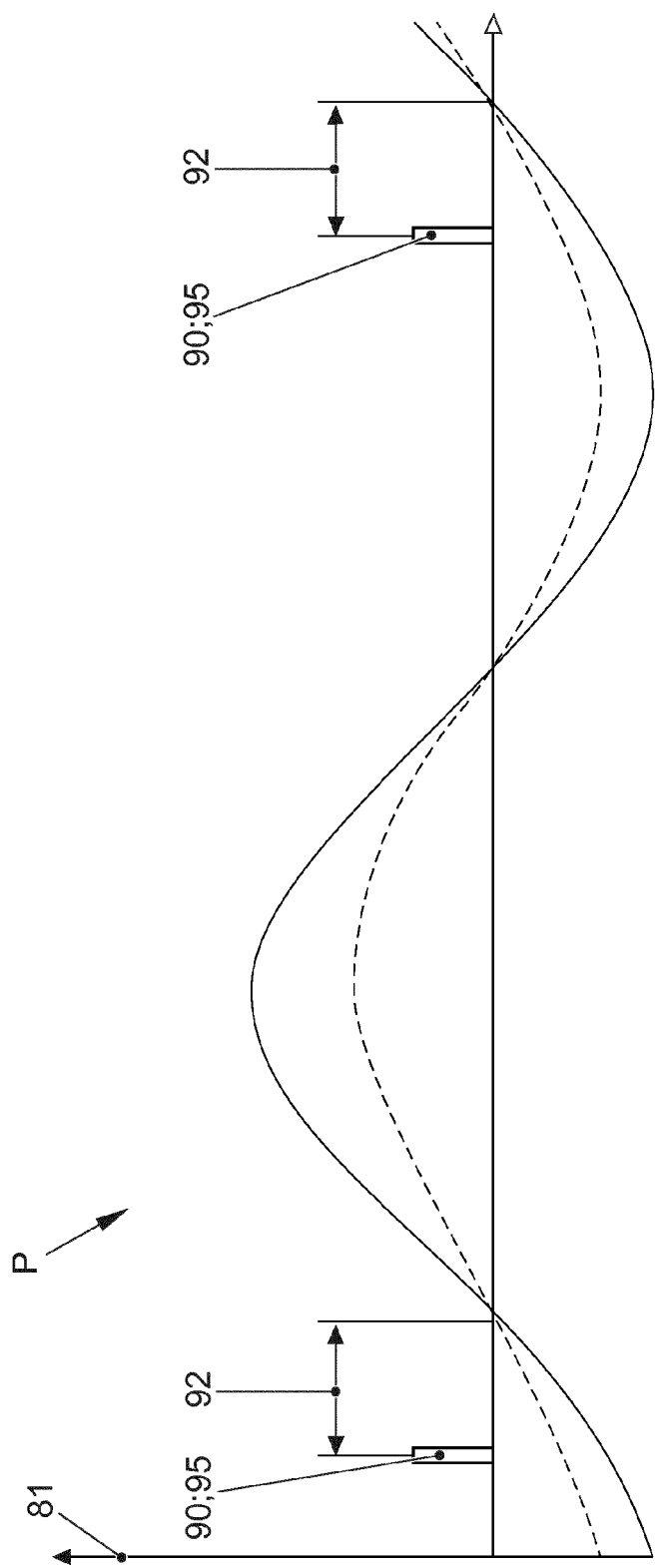

METHOD FOR DETERMINING A POSITION OF A RECEIVER AND POSITIONING SYSTEM FOR A RECEIVER

This nonprovisional application is a continuation of International Application No. PCT/EP2013/067969, which was filed on Aug. 30, 2013, and which claims priority to German Patent Application No. 10 2012 017 387.3, which was filed in Germany on Sep. 1, 2012, and which are both herein incorporated by reference.

BACKGROUND OF THE INVENTION

Field of the Invention

Various embodiments relate to a method for determining a position of a receiver and a corresponding positioning system. In particular, various embodiments relate to techniques which enable a determination of the position of the receiver via rotating magnetic fields.

Description of the Background Art

Techniques are known which enable localization, i.e., position determination, for example of identification transmitters. One example of an identification transmitter would be a key for a motor vehicle; indeed, techniques are known which make it possible to determine the position of the key in the surroundings of the motor vehicle in order to achieve access control for the motor vehicle. Conventional techniques are typically based on a measurement of a field intensity of an electromagnetic field emitted from a centralized transmitter. Since the field intensity decreases as the distance to the transmitted increases (attenuation or dwindling of the field intensity), it is possible to deduce a position in relation to the transmitter from a measurement of the field intensity using a receiver antenna in the key.

However, such techniques can have limited accuracy in terms of determining the position of the identification transmitter, for example due to limited accuracy in the measurement of the field intensity. In known systems, typical accuracies for position determination are 10-20 cm, for example. What is more, systematic distortions can occur: particularly, the reduction in the field intensity of the electromagnetic field can be interfered with by magnetic objects, for example, such as the vehicle body, etc., so that the determination of the position of the identification transmitter can be fraught with certain systematic errors. Such cases can make it necessary to perform a one-time manual measurement of the dwindling of the field intensity in and around the motor vehicle in order to calibrate the position determination. Such manual measurement can be time-consuming, resulting in commensurate costs. The calibration itself can even open up possible sources of error.

Above, the disadvantageous effects of the prior art in relation to the techniques of position determination itself were explained. However, disadvantageous effects can also arise in relation to the system architecture of corresponding devices, as will be explained below. Previously known positioning systems for position determination typically have a central control device which is connected by means of supply lines to the individual transmitters emitting the electromagnetic field. However, the provision of supply lines for the plurality of transmitters, typically three to five, can take up installed space in the motor vehicle and necessitate time-consuming and expensive cabling with two or four-wheeled lines, for example. Moreover, such systems often have only a small degree of modularity, since it is not readily possible to operate the system functionally with a smaller or larger number of transmitters, thus limiting the possibilities for the provision of different equipment options. What is more, the corresponding system can be relatively susceptible to faults, since a power outage or a malfunction of the central control device often can result in a complete breakdown of the system.

For the abovementioned reasons, there is a need for improved methods and systems for determining the position of a receiver. Particularly, there is a need for methods and systems which enable an especially accurate position determination while simultaneously having a low proneness to faults with a simple and cost-effective system architecture.

SUMMARY OF THE INVENTION

It is therefore an object of the invention to provide in an exemplary embodiment a method for determining a position of a receiver. The method comprises the emission of at least one electromagnetic field respectively through a transmitter, with an amplitude of the at least one electromagnetic field rotating respectively as a function of time with respect to the respective transmitter. The further relates to the measurement of the at least one electromagnetic field by the receiver and the determination of a differential phase for each of the at least one electromagnetic field at the position of the receiver based on the measured at least one electromagnetic field. The method further comprises the determination of the position of the receiver based on the at least one determined differential phase.

The electromagnetic field can be a time-dependent electromagnetic alternating field having a certain frequency. The frequency can lie in a range from 100 kHz to 10 MHz, for example, preferably to 1 MHz, and especially advantageously be 125 kHz or 1 MHz The transmitter can, for example, comprise an electromagnetic oscillating circuit with an inductor and a capacitor; a person skilled in the art is familiar with techniques in this regard that enable commensurate designs of the transmitter in order to generate these frequencies.

The electromagnetic (EM) field can be designated as a rotating EM field, for example, since the amplitude can rotate in a time-dependent manner on a plane of rotation around the transmitter, i.e., it can perform a rotational movement at an angular velocity. In other words, points with the same phasing, for example a maximum or minimum of the field intensity of the EM field, can each be arranged in a time-dependent manner in different directions or at different angles with respect to the transmitter. Figuratively speaking, a field intensity maximum can move like the light beam of a lighthouse (the transmitter in this case). In particular, a rotational frequency of the rotational motion can be equal to the frequency of the EM field itself. It is also possible, however, for the rotational frequency to assume other values. The rotational motion of the EM field can (as is typical for cyclical processes) be characterized by a certain phase (phasing) of the motion; one full rotation can correspond to an accumulated phase of 360° or 2π. The rotating EM field can move at a constant angular velocity, for example. In general, certain predetermined dependencies of the angular velocity from the phase (the angle) are also possible. For example, it can be possible for the plane of rotation to be aligned parallel or substantially parallel, i.e., less than ±20°, for example, preferably less than ±10°, especially preferably less than ±2°, with respect to the horizontal, i.e., substantially parallel with a floor.

The rotational motion of the emitted EM field can result in a commensurate time-dependency of the field intensity or the phasing of the EM field at the site of the receiver. The receiver can particularly be set up to measure the field intensity of the EM field in a time-dependent and/or frequency-resolved manner; for this purpose, the receiver can be set up, for example, to measure an amplitude of the magnetic field component of the EM field which, in turn, can be proportion to a field intensity of the EM field. It can then be possible to determine the differential phase from the measurement of the field intensity—with respect to a reference phase, for example, which can particularly be determined from the phase of the EM field at the transmitter during emission.

A situation will now be described as a special illustrative example that must not be interpreted as being limiting: With phasing of 0°, the transmitter emits the EM field such that it points to the east (arbitrarily defined). However, the receiver is located to the south of the transmitter and therefore does not (yet) "see" the maximum. Only at a phase of 90° at the transmitter does the maximum of the amplitude reach the receiver (if the rotating EM field is rotating clockwise). The differential phase can therefore be referred to as −90° in this example. An analogous example can of course also be illustrated for values of the EM field other than the maximum of the amplitude. For example, this can pertain to a certain trigger level of the amplitude that is defined with respect to the rising or falling edge.

Of course, it is generally equally possible to determine the differential phase with respect to another reference phase, for instance with respect to an internal clock or an external trigger signal, such as the actuation of a door handle by a user or a recognized object in a surrounding area or the like. It is also possible, for example, to consider a minimum or a zero point instead of the maximum of the amplitude or field intensity, or any phasing or significant points of the time course of the characterizing observable. In general, an amplitude of the magnetic component of the electromagnetic field can be considered, or an amplitude of the electrical component; both can be significant for the field intensity of the EM field. However, the transmitter and/or the receiver can have at least one inductor that is set up to interact inductively with the magnetic component of the electromagnetic field.

The position of the receiver can be determined from the differential phase. Here, the term "position" can refer to the widest range of accuracies of position determination: In one especially simple embodiment, the term "position" can merely refer to an angle of the receiver with respect to the transmitter (−90° in the above example). It is also possible, however, for the term "position" to also refer, in addition or alternatively to the angle with respect to the transmitter, to a spacing with respect to the transmitter, for example within the plane of rotation of the EM field. Furthermore, it is possible for the term "position" to additionally or alternatively refer to a spacing with respect to this plane of rotation of the EM field, for example, i.e., perpendicular to the plane of rotation; in such a case, it can particularly be possible for the term "position" to refer to an absolute position determination of the receiver within the reference coordinate system; the reference coordinate system can generally be selected arbitrarily, but it can be desirable to define it in relation to the at least one transmitter (for example, the latter can be arranged at the origin of the reference coordinate system). In other words, the term "determining of a position" can refer to the determination of individual coordinates of the three-dimensional space, such as spacing and/or azimuth angle and/or polar angle of a spherical coordinate system, or to all of the coordinates of the three-dimensional space.

For example, it can be desirable in various embodiments to perform an especially accurate determination of the position of the receiver. An especially accurate determination of the position of the receiver can particularly include the determination of several or all coordinates of the three-dimensional space. Particularly in such a case, it can be possible to emit more than one, for example two or three, electromagnetic fields through several transmitters, thus two or three transmitters, for example. In other words, there can be one transmitter per field. It is then possible to determine several differential phases—for example, with respect to each of the EM fields emitted by the several transmitters— and to determine the position of the receiver especially accurately in consideration of the several differential phases.

In various embodiments, it can be possible for several EM fields to be emitted simultaneously at different frequencies—so-called frequency-multiplexing. It can then be possible for the receiver to be equipped to measure the several EM fields at the various frequencies. Frequency-multiplexing can have the effect of an especially fast determination of position.

It is possible for the emission to occur sequentially for two or more electromagnetic fields and for the measurement for the two or more electromagnetic fields to be done sequentially. The determination of the position of the receiver can be done based on a triangulation for the at least two differential phases, and the determination of the position of the receiver can include the determination of a direction in and distance at which the receiver is arranged on a plane of rotation of the time-dependent electromagnetic field with respect to at least one of the transmitters. Such a case can also be referred to as time multiplexing, since the several EM fields are transmitted sequentially, that is, one after the other or at different times. Several differential phases from the several measured EM fields can then be known, and the triangulation can make an especially accurate determination of the position, and particularly also the distance to one or more transmitters. Triangulation can generally mean the determination of the position based on the measured differential phases and a known arrangement of the several transmitters with respect to each other. Techniques for triangulation are known to a person skilled in the art as a matter of principle, so no further explanation of the details is required here.

In particular, it can also be possible to determine the position in a reference coordinate system in which a position of the transmitters is also known. Particularly, it can be possible, to wit, for the transmitters to be arranged in a stationary manner, for example in relation to the reference coordinate system, and the receiver to be arranged in a moveable manner. For example, the direction can be indicated as an azimuth angle in a reference coordinate system with spherical coordinates originating from one of the transmitters. Other definitions are possible.

Such techniques which include the emission of two or more EM fields can enable an especially accurate determination of the position of the receiver, and they can make it possible to determine two or three coordinates of the position of the receiver. The determined position can be displayed, for example, on a display for a user. This can also make locating the receiver simple. Particularly, by applying the technique of triangulation, the effect of precise position determination can be achieved. It should be understood that the determination of a differential phase for the rotating EM fields can be done with relative precision, i.e., with a relatively low number of errors, particularly in comparison to conventional techniques, which are based on a measurement of the field intensity of the EM field and in which the position determination is based on an attenuation rate of the amplitude of the EM field. In particular, it can be unnecessary in various embodiments even to take this attenuation rate of the amplitude of the EM field into account at all; consequently, it can also be superfluous in various embodiments to detect the attenuation rate of the field intensity of the EM field in a calibration measurement described at the outset. This can reduce costs for the implementation of the method for determining the position of the receiver. It should be understood, however, that it is also possible as an alternative or in addition to take the attenuation rate of the field intensity of the EM field into account. In fact, that can enable a particularly high level of accuracy in the position determination. Particularly, the two or more EM fields can be emitted such that they all rotate on one plane of rotation.

It is also possible for the emission and the measurement to be done for a single electromagnetic field, in which case the determination of the position of the receiver the determination of a direction in which the receiver is arranged on a plane of rotation of the time-dependent electromagnetic field with respect to at least one of the transmitters.

In such a case, in which only a single electromagnetic field is emitted and measured, an especially quick and simple determination of the position of the receiver can take place. However, it should be understood that it is possible that not all three space coordinates can be determined for absolute positioning, for example in a reference coordinate system. Rather, in order to more accurately determine the position of the receiver, it may be necessary to combine additional information about the position of the receiver, for example from other sensor data, with the technique described above. It can be possible to measure the field intensity of the one electromagnetic field at receiver and to determine the spacing of the receiver with respect to the transmitter from that. It is then possible, in turn, to perform accurate positioning with only one EM field.

The method can further comprise the receiving of an estimation of the position of the receiver, in which case the emission of the at least one electromagnetic field takes the estimation of the position into account.

It is possible, for example, for the estimation of the position to be obtained from other sensor data. For example, if the inventive method is applied to determining the position of a key of a motor vehicle, the estimation of the position can be obtained from elements of the following group: actuation of a door handle of the motor vehicle, capacitive sensor data, and optical sensor data. In other words, the estimation of the position of the receiver can specify a range of possible positions of the receiver; the range can be defined, for example, in a reference coordinate system.

On the other hand, if one turns to the above illustrative and non-limiting example, which uses cardinal directions with respect to the transmitter for illustration, this could mean: The estimation of the position of the receiver specifies that the receiver is located at a position between the north direction and the east direction in relation to the transmitter. In such a case, it may be possible to emit the EM field such that its rotational motion merely passes over this angular range of the estimated position, i.e., it only rotates from the north to the east, for example. The measurement time of the EM field can thus be reduced, which can reduce the time required for determining the position on the one hand and reduce the energy consumed for emission on the other hand. The latter can be advantageous particularly in applications in which only a limited reservoir of energy is available for the emission of the at least one EM field. one commensurate exemplary application would be the determination of the position of the key for an electrically powered vehicle with a limited battery capacity, for example.

It is possible for the emission to occur as a function of the estimation of the position of the receiver either sequentially for the two or more electromagnetic fields or for the single electromagnetic field. For example, it can be possible to emit only one EM field if the estimation of the position lies within a certain predetermined range—for instance, in the application for locating the key in the vehicle behind the hatch door or next to the passenger door or below a certain minimum distance in relation to the outside of the vehicle, etc. Depending on the estimation of the position, an only relatively more imprecise position determination can be desired. Accordingly, it is also possible to emit several EM fields, thus achieving improved accuracy of the position determination, for example. In particular, it can also be possible for the estimation of the position to already determine one or more position space coordinates precisely; it can then be possible to emit one or two EM fields in such a way that the remaining position space coordinates can be determined.

The method can further comprise the determination of a field intensity for the at least one electromagnetic field in the position of the receiver based on the measured at least one electromagnetic field, in which case the determination of the position of the receiver includes the determination of the distance of the receiver to a plane of rotation of the electromagnetic field based on the determined field intensity.

It can be determined on the basis of the field intensity, e.g., qualitatively or quantitatively, whether the receiver is located above or below the plane of rotation. An inductor can be provided particularly for this purpose as a transmitter which forms a certain angle with the plane spanned by the other inductors. To wit, if the receiver is spaced apart from the plane of rotation, it is possible to bring about lesser or greater field intensities at the same position within the plane of rotation (distance to the transmitter, angle to the transmitter). The amplitude of the magnetic field component can be used as a measure for the field intensity, for example. Alternatively or in addition, it can also be desirable to determine a distance of the receiver only above the plane of rotation based on the field intensity. This can be the case if the transmitters are at a short distance from the ground and the receiver is therefore not necessarily spaced upward with respect to the plane of rotation.

The method can further comprise the modulation of the at least one electromagnetic field for the transmission of information to the receiver, the elements comprising information that is selected from the following group: timing information of a reference phase, identifying information of the at least one transmitter.

It can be possible here to use modulation techniques that are selected from the following group: frequency modulation (FM), phase modulation (PM), "frequency shift keying" (FSK), "phase shift keying" (PSK), pulse amplitude modulation (PAM), and pulse code modulation (PCM). In general, additional modulation techniques that are known to a person skilled in the art as a matter of principle are also possible.

The identifying information can include, for example, information on a position of the respective transmitter. This positional information can indicate, for example, where the respective transmitter is located in relation to the vehicle, such as "front-right" or "left" or "rear-right," etc. For example, it is possible to transmit this positional information explicitly or as a code that can be correlated, for example, with the positions in a table in the receiver, for example.

When there are several emitted electromagnetic fields, it is generally possible for the various emitted electromagnetic fields to have different modulation techniques and/or modulation frequencies. It is also possible for the various EM fields to have the same modulation techniques but different modulation frequencies. It is also possible to have the modulation technique and modulation frequency be the same for all EM fields. Each piece of information can be differentiated.

For example, it is possible for each rotating EM field to be generated by a plurality, e.g., three or four, EM fields that are emitted by individual inductors with predetermined phasing. These EM fields generating the rotating EM field can, in turn, be modulated differently, for example in order to transmit different information.

Depending on the specific application of the method for determining the position of the receiver, a certain modulation technique and/or modulation frequency can be preferred. For example, the modulation technique for use in determining the position of a motor vehicle key can be selected differently in comparison to the localization of people in a building space.

In particular, it can be possible for the detection of the differential phase to still be based on the timing information of the reference phase. For example, the differential phase can be determined in relation to the reference phase. In that case, the timing information can have different informational content depending on the embodiment: In one especially simple embodiment, it is possible for the timing information to merely indicate a zero point (or an integer multiple of 360°) of the reference phase. In various other embodiments, however, it can be possible for the reference phase to be transmitted in a time-resolved manner via the timing information. In this way, it can be possible to determine the current phasing or reference phase in a fraction of a rotation of the EM field. It is also possible, of course, to transmit the reference phase in certain increments, for example in intervals of $\pi/2$ or $\pi/4$ or $\pi/8$, etc.

The identifying information can be used, for example, in applications which include an authentication of the receiver. For example, during the position determination of a motor vehicle key, the identifying information of the at least of the vehicle [sic] can be compared to identifying information of the receiver in order to prevent unauthorized access.

It can be possible for there to be a correlation between the frequency of the EM field and the decay rate of the field intensity. For this reason, it can be possible, depending on the frequency of the EM field, to implement different-sized ranges in which the position determination can be performed; such ranges can be determined via a field intensity of the EM field that is greater than a threshold value (sensitive ranges), so that, in particular, a signal-to-noise ratio in the measurement of the EM field is sufficient. In different frequency ranges, such as the abovementioned frequency ranges, a higher (lower) frequency can bring about a lesser (greater) decay rate of the field intensity, thus enabling a larger (smaller) sensitive range. It will be explained below how the method for position determination can exploit this insight according to the present aspect in various embodiments.

The method can comprise the emission of at least one other electromagnetic field by a respective transmitter, in which case the at least one other electromagnetic field can have a frequency that is greater than a frequency of the at least one electromagnetic. Moreover, the method can comprise the measurement of the at least one other electromagnetic field by the receiver and the detection of a field intensity for each of the at least one other electromagnetic field at the position of the receiver based on the measured at least one other electromagnetic field and the determination of a distance of the receiver to the at least one transmitter based on the at least one detected field intensity.

On the other hand, the amplitude—of the magnetic component, for example—can be used as a measure for the field intensity. For example, in one especially preferred embodiment, it can be possible for the frequency of the other EM field to be about 1 MHz and the frequency of the EM field to be 125 kHz. In such a case, the decay rate of the field intensity of the other EM field can be lesser than decay rate of the EM field. In various embodiments, it can be possible for the other electromagnetic field to rotate respectively as a function of time in relation to the respective transmitter. In other words, it can be possible for the other EM field to also be a rotation field or a rotating EM field.

However, it is not necessary for the other EM field to be a rotation field. For example, it can be possible in various embodiments for the other EM field to have no or only a slight time-dependency of the field intensity on the angle with respect to the transmitter or for the angular velocity to be 0. In the latter case, by detecting the field intensity, it can be possible to determine the distance, i.e., a component of the position in three-dimensional space. In particular, this can be done using especially simple technical means, and especially quickly compared to embodiments that determine a differential phase.

For example, it can be possible in various applications to determine an approach of the receivers to the transmitters via the emission of the at least one other electromagnetic field. This is possible because the sensitive range can be greater for the at least one other electromagnetic field than the sensitive range for the at least one electromagnetic field. In particular, the emission of the at least one other electromagnetic field that is not a rotation field can have relatively low energy consumption.

It is possible, for example, for the determination of the distance of the receiver to be made on the basis of the at least one detected field intensity for determining the position of the receiver in an area remote from the at least one transmitter, and the determination of the position of the receiver can be made based on the at least one determined differential phase for determining the position of the receiver in an area near the at least one transmitter. The emission and the measurement of the at least one electromagnetic field, as well as the determination of the differential phase for each of the at least one electromagnetic field and the determination of the position of the receiver can be made selectively based on the at least one determined differential phase while taking the determination of the distance of the receiver with the at least one other EM field into account.

For example, the remote range can extend to larger distances from the transmitter than the near range. The remote range can surround the near range and be adjacent thereto.

For example, if a certain distance from the receiver to the transmitter has been determined on the basis of the measured field intensity of the at least one other EM field—for example, smaller than a certain threshold value—the at least one EM field can be emitted selectively and carried out according to the following steps (measurement, determination of differential phase, determination of position).

Above, reference was made primarily to characteristics of the rotating EM field itself. Below, aspects pertaining to the transmitter will be discussed.

The emission of the at least one time-dependent electromagnetic field can respectively include the phase-shifted provision of at least three inductors of the at least one transmitter arranged on a plane of rotation of the electromagnetic field with current, the phase-shifted supply taking a structurally predetermined angular arrangement of the at least three inductors on the plane of rotation into account, so that a rotational frequency of the electromagnetic field is equal to a frequency of the electromagnetic field.

For example, it can be possible in various embodiments for three (four) inductors to be arranged at angles of 120° (90°) on a plane, i.e., the coil plane or plane of rotation. It can also be possible, however, to tilt individual inductors from this plane, for example by an angle of 20° or 40°, preferably less than 90°, so that a component of the EM field of the respective inductor remains within this plane. If the inductors are not arranged at the same angle to the adjacent coil, a temporal adjustment of the inductors' supply of current can compensate for an arrangement deviating from the symmetrical arrangement described above; "compensate" can mean here that the rotating EM field moves at a constant angular velocity independently of the geometric arrangement of the inductors. Each of the inductors can generate an EM field which can therefore be modulated individually. The superposing of the EM fields generated by the individual inductors can result in the rotating EM field.

It is possible, for example, for the inductors to be supplied with current such that the rotating EM field is emitted in such a way that it undergoes two or more rotations, i.e., accumulates phases of $2\pi$, $4\pi$, etc. It is also possible for the inductors to be provided with current such that the rotating EM field is emitted in such a way that it undergoes only a fraction of an entire rotation, for example a ¼ turn or ½ turn, i.e., accumulates phases of $\pi/2$ or $\pi$.

It is possible for the emission of the at least one time-dependent electromagnetic field to be triggered by a trigger signal transmitted by a control device. This makes it possible, for example, for the phases of several emitted time-dependent EM fields to be synchronized. This can have the effect of an especially simple determination of the differential phase. For example, the at least one EM field can be emitted with a certain time-shift with respect to the trigger signal; it is also possible for different EM fields to have a different time-shift with respect to the trigger signal. The trigger signal can continue to transmit information over this time-shift.

It is possible for the receiver to be moveable with respect to the at least one transmitter and for the at least one transmitter to be connected to a control device. The method can further [comprise] the wireless transmission of the determined differential phase and/or of the determined position from the moveable receiver to the control device. It can be possible for the steps of the determination of a differential phase and determination of the position to be performed in a processor unit of the receiver. It would also be possible for only the measurement of the EM field to be performed in the receiver and for the abovementioned steps to be performed in a processor unit which is also stationary and connected, for example, via a bus system to the transmitters and/or the control device. It would also be possible for only the determination of the position based on the differential phase (i.e., triangulation, for example) to be performed in such a stationary processor unit. Here, "stationary" can mean firmly mounted in a motor vehicle.

According to another aspect, the invention relates to s method for determining a position of an identification transmitter for an access control for a motor vehicle which is configured according to the method for determining a position of a receiver according to another aspect of the invention.

For example, the identification transmitter can be a key of the motor vehicle. In particular, it is possible for identifying information, which is transmitted to the identification transmitter through modulation of the electromagnetic field, for example, to be compared to identifying information of the identification transmitter. This can be used for authentication or access control.

For such a method for determining the position of the identification transmitter, effects can be achieved that are comparable to the effects that can be achieved for a method for determining the position of the receiver according to another aspect of the invention.

According to another aspect, the invention relates to a positioning system for a receiver, the positioning system comprising at least one transmitter that is respectively set up to emit a time-dependent electromagnetic field, an amplitude of the electromagnetic field rotating as a function of time with respect to the transmitter. The positioning system further comprises the receiver, which is set up in order to measure the at least one time-dependent electromagnetic field. The positioning system further comprises a processor unit, which is set up to carry out the following steps: Determination of a differential phase for each of the at least one electromagnetic field at the position of the receiver based on the measured at least one time-dependent electromagnetic field; and determination of the position of the receiver based on the at least one determined differential phase.

For example, it is possible for the processor unit to be arranged within the receiver. However, it is also possible for the processor unit to be arranged outside of the receiver. It is also possible for portions of the steps of the processor unit to be carried out within the receiver, such as the determination of the differential phase, whereas other portions are performed outside of the receiver, such as the determination of the position of the receiver. It is possible for the processor unit or functions of the processor unit to be implemented as hardware or software or a combination thereof and/or to be carried out on different hardware units.

Moreover, the positioning system according to the aspect currently being discussed can be set up to carry out a method for determining a position of a receiver according to another aspect of the present invention. For such a positioning system, effects can be achieved that are comparable to the effects that can be achieved for the method for the determination of the position of the receiver according to the other aspect of the invention.

According to another aspect, the invention relates to a motor vehicle which comprises a positioning system for a receiver, the positioning system comprising at least one transmitter which is respectively set up to emit a time-dependent electromagnetic field, an amplitude of the electromagnetic field rotating as a function of time with respect to the transmitter. The positioning system of the motor vehicle further comprises the receiver, which is set up to measure the at least one time-dependent electromagnetic field. The positioning system of the motor vehicle further comprises a processor unit, which is set up to carry out the following steps: Determination of a differential phase for each of the at least one electromagnetic field at the site of the receiver based on the measured at least one time-dependent electromagnetic field; and determination of the position of the receiver based on the at least one determined differential phase.

According to an aspect, the invention relates to a coil arrangement for generating a rotating electromagnetic field, the coil arrangement comprising at least three inductors, each with at least one associated coil winding. The coil arrangement further comprises a ferromagnetic coil yoke, which brings about a magnetic coupling of the at least three inductors.

The at least one coil winding can itself comprise several windings of an electrically conductive wire or conductor paths. The inductors can comprise one or more coil windings; in other words, if there are several coil windings of an inductor are present, they can be contactable or tappable in an electrically separate manner.

The magnetic coupling can be characterized by a certain magnetic flow of a certain size, for example. For example, a magnetic flow can be produced by the continuous connections of the coil yokes. In particular, the coil arrangement can be set up [such] that the magnetic flow in a center of the coil arrangement takes on a certain value, e.g., about or exactly 0. For example, the coil yoke can be continuous, that is, without or with only few and/or very small or short interruptions or air gaps. It can be made of a ferromagnetic material, such as iron, chromium, nickel, oxides of these materials such as ferrite, alloys of iron, chromium, nickel, etc. The magnetic coupling can refer to a ferromagnetic exchange interaction that occurs over the entire area of the coil yoke.

It is possible for the at least three inductors to be arranged on a coil plane and for adjacent inductors within the coil plane to be arranged at angles of approximately 120°. For example, adjacent inductors can be arranged at angles of 120°±10°, preferably ±5°, especially preferably ±0.5°. It can then be possible, to generate the rotating electromagnetic (em) field with a relatively simple control for the inductors (e.g., with alternating voltages that are phase-shifted by 120°). In general, however, other angles that enclose the adjacent inductors within the coil plane with each other are also possible. If the inductors are arranged within the coil plane, this can mean that the inductors (or their central axes) do not enclose any angle with vectors that span the coil plane, or only a small angle, for example ±10°, preferably ±5°, especially preferably ±1°.

When adjacent inductors are at different angles within the coil plane, it can be possible to adapt a phase-shift of the alternating voltages for controlling the various inductors appropriately to the different angles, so that a rotating electromagnetic field is produced which has a constant angular velocity.

It is of course also possible, for example, to use four or six or more inductors which are arranged on the coil plane at predetermined angles to adjacent inductors. Merely for illustration, and without constituting a limitation, four (six) inductors can be arranged at angles of 90° (60°). Additional commensurate symmetrical configurations are possible in which adjacent inductors always have the same angle with respect to each other.

Above, embodiments were described in which all of the inductors lie within a coil plane. Such a coil plane can determine a plane of rotation of the rotating EM field. However, embodiments are also possible in which individual or several inductors lie outside of the coil plane, which is defined by at least two inductors. In other words, individual or several inductors can be tilted with respect to the coil plane. Even in such a case, it can be possible for the coil plane to define the plane of rotation.

It is possible for the ferromagnetic coil yoke to be arranged continuously within the at least three inductors and for the coil arrangement to still comprise at least three capacitors, each of which is connected in series with one of the at least three inductors and comprises a housing with external electrical contacts and mechanical supports. In other words, each inductor can be connected in series (serial connection) to a capacitor. The values of the inductance of the inductor and of the capacity of the capacitor can then determine a frequency of the respectively generated EM field in a manner known to a person skilled in the art. The frequency can lie, for example, in a range from 100 kHz to 10 MHz, preferably to 1 MHz, or especially advantageously be 125 kHz or 1 MHz.

It is possible for there to be two or more coil windings present per inductor, each with a number of windings that can be controlled jointly or separately, and for the coil arrangement to still comprise at least three additional capacitors, each of which is connected in parallel to one of the two or more coil windings per inductor. In this way, it can be possible to provide several separably and electrically contactable coil windings in one inductor, thereby providing different inductances. It is therefore possible to make several oscillating circuits available with different resonance frequencies. The coil arrangement can thus emit EM fields having different frequencies. Moreover, through parallel connection of the other capacitors, each with one coil winding, it becomes possible to operate the coil arrangement with a relatively low power input, particularly for serial connection with capacitors. This can be advantageous particularly in applications in which only a limited energy reservoir is available.

In general, it can be possible for the at least one coil winding of the at least three inductors to each have the same geometry and/or windings. In other words, the at least three inductors can be of the same kind and type. It can thus be possible, by means of an especially simple supply of current, to generate the rotating EM field, which advantageously has a constant angular velocity of rotation.

Above, reference was made primarily to a coil arrangement with at least three inductors. It is possible to operate several such coil arrangements in combination as a positioning system for a receiver.

According to another aspect, the invention relates to a positioning system for determining a position of an identification transmitter for a motor vehicle, the positioning system comprising at least two coil arrangements according to another aspect of the invention, the at least two coil arrangements being mounted and set up in a stationary manner in different places in the vehicle in order to each be operated as a transmitter for a rotating electromagnetic field. The positioning system further comprises the identification transmitter with a receiving coil, the identification transmitter being set up so as to be operated as a receiver for the at least two rotating electromagnetic fields.

For example, the positioning system can be set up to determine the position of the identification transmitter in an exterior space, i.e., surroundings or the environment of the vehicle. Alternatively or in addition, the positioning system can be set up to determine the position in an interior space of the vehicle.

It is thus possible, for example, for a frequency of the receiving coil to be coordinated with the frequencies of the at least two coil arrangements. Three or four coil arrangements can preferably be provided, for example. The coil arrangements can be mounted so as to be spaced apart from each other. For example, such a positioning system can be set up to execute the method for determining the position of the receiver.

Through the use of at least two coil arrangements and at least two rotating electromagnetic fields, an especially accurate determination can be made of the position of the identification transmitter. For example, by determining a reference phase with respect to the at least two rotating electromagnetic fields and a triangulation based on the determined at least two differential phases, it can be possible to achieve an accurate determination of the position of the identification transmitter within a plane of rotation of the electromagnetic fields.

The positioning system can further comprise a control device which is set up to control the at least two coil arrangements for emitting the respective rotating electromagnetic field in a predetermined sequence.

The control device can be a central processor unit of the vehicle, for example. For example, the control device can be implemented as hardware or software or a combination thereof o the central processor unit of the vehicle.

It is possible for the control device to be coupled via a bus system with the at least two coil arrangements and for each of the at least two coil arrangements to be coupled with a supply line and for each of the at least two coil arrangements to be set up to receive a control signal of the control device via the bus system and to generate the rotating electromagnetic field as a function of the control signal, the energy for emitting the rotating electromagnetic field being obtained via the supply line.

For example, the coil arrangements can comprise a processor unit as an interface for communication with the control device via the bus system. The processor unit can be set up to receive and process the control signal.

The supply line can be an on-board electrical system of a motor vehicle, for example. The supply line can, for example, have different current-voltage ratios than are required to control the inductors of the coil arrangements in order to generate the rotating EM field. For example, the supply line can make a 12 V direct current voltage available. Therefore, the coil arrangements can have a switching circuit for current-voltage conversion, i.e., an alternating current voltage source. In this way, it can be possible, for example, to supply the coil arrangements in a decentralized manner with power in order to generate the rotating EM field. As a result, a simplified system architecture can be achieved; in particular, it can be unnecessary to supply dedicated supply lines from the control device to the individual coil arrangements. In response to an instruction of the control device via the bus system, the coil arrangements selectively take power from the on-board electrical system in order to generate the rotating EM field. Typically, supply lines of the on-board electrical system are already present in various areas of the vehicle anyway, so no further structural changes may be necessary.

According to another aspect, the invention relates to a motor vehicle with a positioning system for determining a position of an identification transmitter for a motor vehicle, the positioning system of the motor vehicle comprising at least two coil arrangements according to another aspect of the invention, the at least two coil arrangements being mounted in a stationary manner in various places in the motor vehicle and set up to each be operated as a transmitter for a rotating electromagnetic field. The positioning system of the motor vehicle further comprises the identification transmitter with a receiving coil, the identification transmitter being set up to be operated as a receiver for the at least two rotating electromagnetic fields.

The features described above and features that will be described below can be used not only in the corresponding explicitly portrayed combination but also in other combinations or alone without going beyond the scope of protection of the present invention. For example, features and characteristics that were described in relation to the EM field can be applied to the other EM field at a different frequency. Aspects of the different positioning systems can also be applied to the aspect of the motor vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows the rotation of the electromagnetic field of the coil arrangement of FIG. 1 by means of the time-progression of the isocontour plots of the amplitude of the magnetic field component;

FIG. 6 shows a measured amplitude of the magnetic component of the rotating electromagnetic field of FIG. 5 at a point within the plane of rotation spaced apart from the transmitter as a function of time;

DETAILED DESCRIPTION

The present invention will be explained in further detail below on the basis of exemplary embodiments with reference to the drawings. Techniques for localization or position determination are explained on the basis of the figures: Here, various aspects relate to inductors and coil arrangements which enable the emission of an electromagnetic rotating field, as well as to positioning systems comprising several such coil arrangements and have a certain system architecture, as well as to the underlying techniques which enable the position determination on the basis of the rotating magnetic fields.

Figure 1:
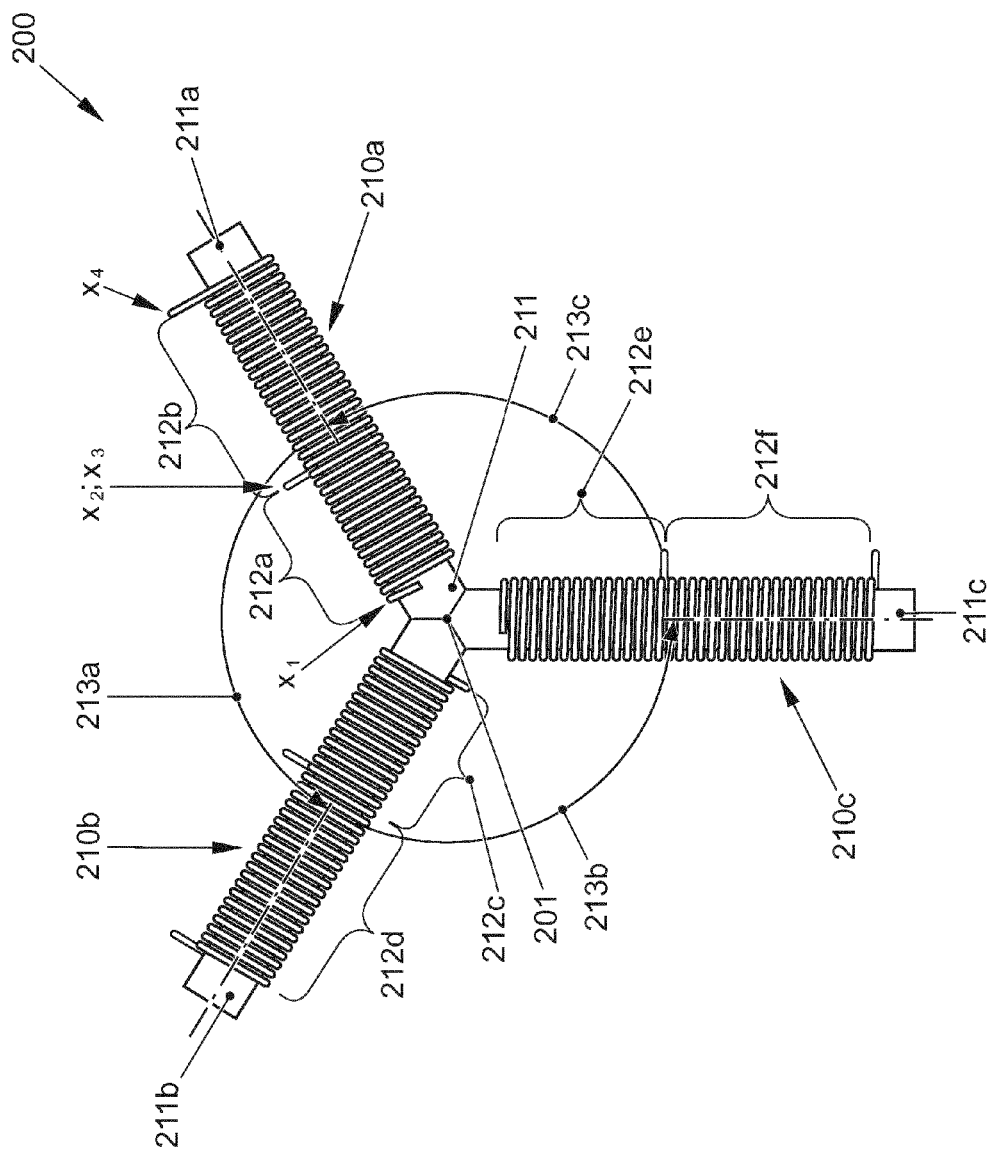
FIG. 1 shows a top view of a coil arrangement for a positioning system, the coil arrangement having three inductors, each with two coil windings.

In FIG. 1 is a top view of a coil arrangement which comprises three inductors 210a, 210b, 210c. The inductor 210a has two coil windings 212a, 212b. The inductor 210b has two coil windings 212c, 212d. The inductor 210c has two coil windings 212e, 212f. The coil windings 212a-212f are each wound around one of three arms 211a, 211b, 211c of a ferromagnetic coil yoke 211 and can be contacted electrically separately. The coil yoke can be made of iron, nickel, chromium, oxides or alloys of these materials, for example. The arms 211a, 211b, 211c have a circular cross section and are therefore cylinder-shaped. They can have a diameter of 3 mm-30 mm, preferably 6 mm. The shape of the arms is variable. They extend radially from a center of the coil arrangement 200. The coil yoke is continuous and therefore particularly has no large holes or gaps—for which reason a magnetic coupling (in form of a ferromagnetic exchange interaction that brings about a great magnetic flow) is able to build up between the three inductors 210a, 210b, 210c. Depending on the inductance desired (and hence the frequency of the electromagnetic field), a different number of windings can be selected.

The magnetic flow can take on different values at different points of the coil arrangement 200. These values can be predetermined by the structural shape of the coil arrangement 200. For example, in the center of the coil arrangement 200, the magnetic flow can assume a value of zero or near zero, i.e., a very low value.

Figure 2B:
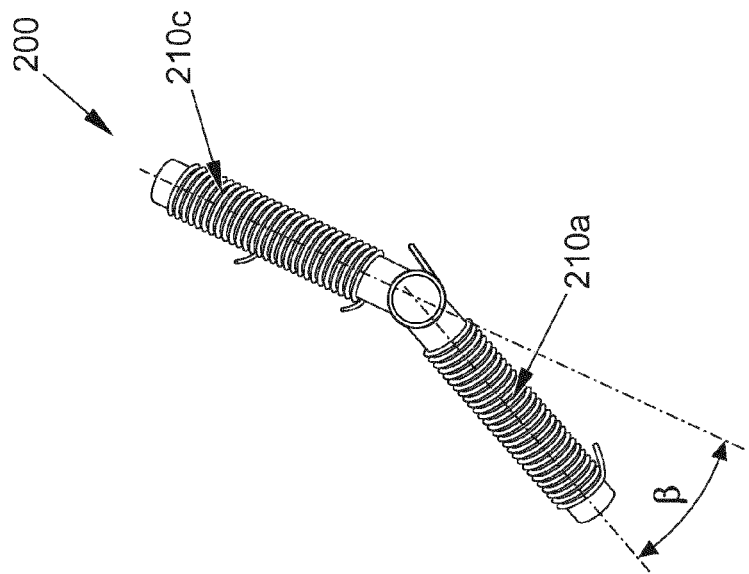
FIG. 2B shows a side view of the coil arrangement from FIG. 2A.
Figure 2A:
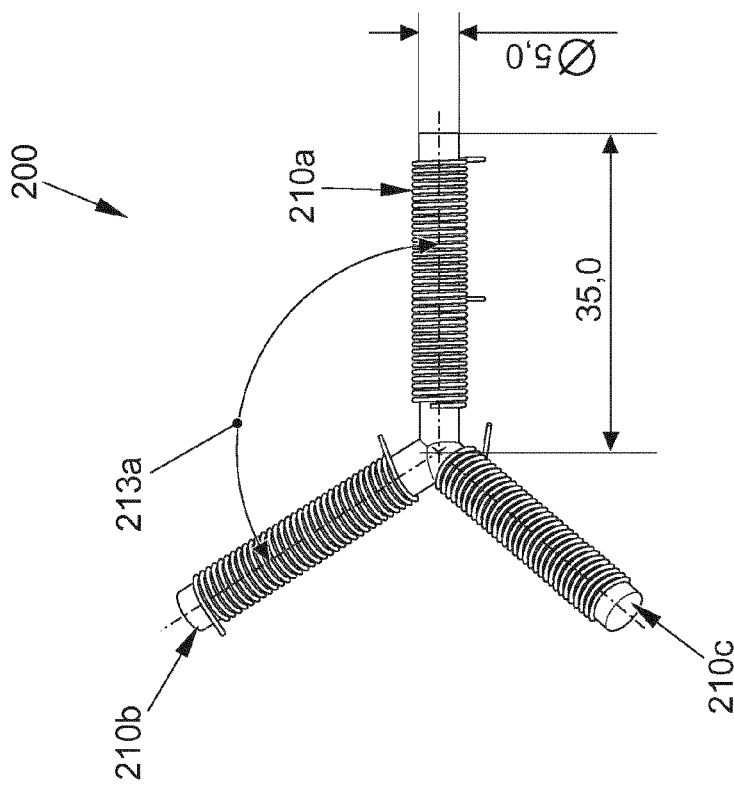
FIG. 2A shows a top view of a coil arrangement according to FIG. 1 in which one inductor is tilted with respect to a coil plane.

As can be seen from FIG. 1, the inductors 210a, 210b, 210c all lie on one plane. FIGS. 2A and 2B show an alternative embodiment in which the inductor 210c is tilted with respect to this plane (coil plane) by an angle β. A small dimension of the coil arrangement 200 on the coil plane can thus be achieved. The angle β can lie in a range from 20°-30°, for example.

Again with reference to FIG. 1, the inductor 210a forms an angle 213A with the inductor 210b. The inductor 210b forms an angle 213B with the inductor 210c. The inductor 210c forms an angle 213C with the inductor 210a. These angles 213a, 213b, 213c each extend within the coil plane. In the embodiment of FIG. 1, these angles 213a, 213b, 213c assume equal values, namely 120°. In other words, the coil arrangement 200 of FIG. 1 has a star-shaped configuration. While FIG. 1 shows a highly symmetrical embodiment, it is generally possible, however, for the various angles 213a, 213b, 213c to assume different values, which can be desirable particularly if a structural shape of the coil arrangement 200 is subject to certain limitations due to structural restrictions. The angles 213a, 213b, 213c are not especially limited and can take on the widest variety of values. For example, the angles 213a-213b-213c could each assume the following values: 180°-90°-90°; 200°-80°-80°, 160°-100°-100°.

As shown in FIGS. 2A and 2B, individual inductors 210c can be tilted out of the coil plane. As a result, the lateral dimensions of the coil arrangement 200, i.e., the dimensions within the coil plane spanned by the inductors 210a, 210b, can be reduced. However, since a component of the time-dependent electromagnetic field generated by the inductor 210c still lies within the coil plane, an electromagnetic field can be generated with the coil arrangement 200 of FIGS. 2A and 2B which is comparable to the electromagnetic field of the coil arrangement 200 of FIG. 1.

While FIGS. 1, 2A, 2B each show cases in which the coil arrangements 200 comprise three inductors 210a, 210b, 210c, it is generally possible to use more inductors. For example, an embodiment is conceivable in which the coil arrangement 200 comprises four (six) inductors, each of which forms an angle of 90° (60°) with respect to each other within the coil plane.

Above, reference was made primarily to structural features of the coil arrangement 200. Below, it will be explained how it is possible to generate a rotating electromagnetic (em) field by means of such coil arrangements 200. The rotating EM field is generated by a superposition of the EM fields emitted by the individual inductors 210a, 210b, 210c. The rotating EM field can refer here to such a field in which points of the same phase of the EM field rotate as a function of time around the coil arrangement 200 (for instance, its midpoint 201; see FIG. 1).

Figure 3:
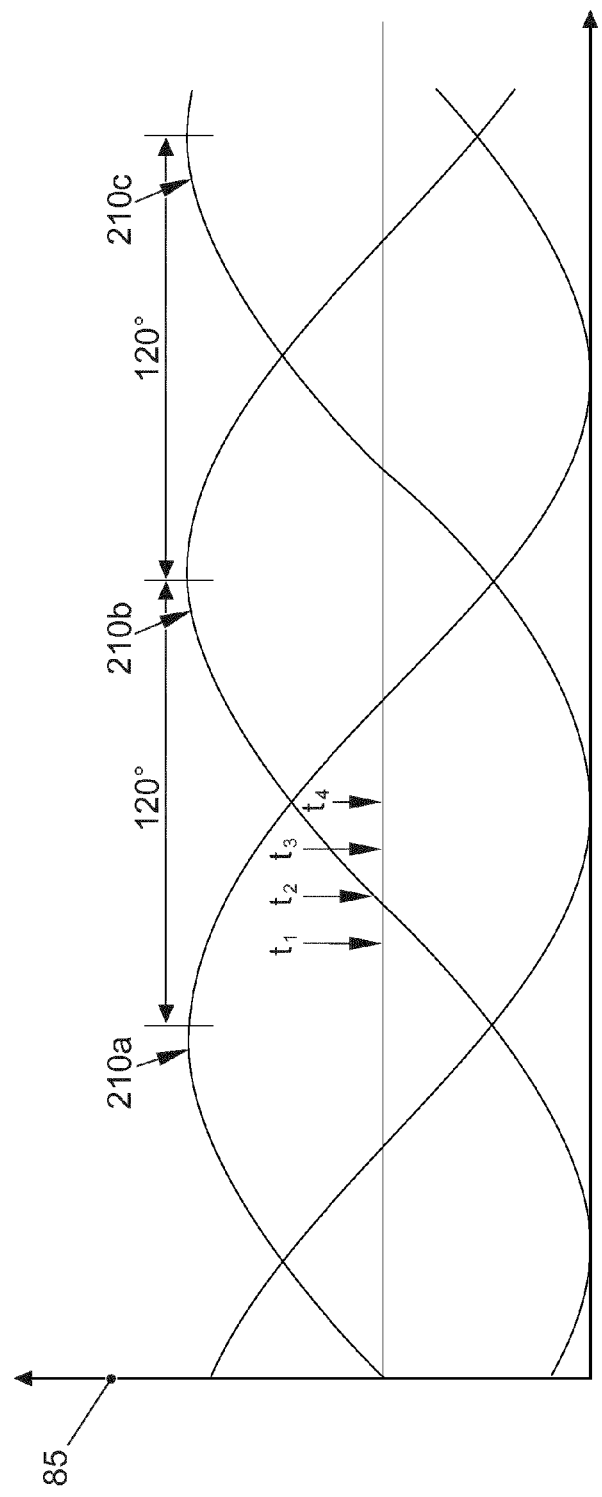
FIG. 3 shows the current through the inductors of the coil arrangement of FIG. 1 as a function of time, the current being generated by an alternating current voltage.

To generate an EM field, the inductors 210a-210c are controlled together with a capacitor (not shown in FIGS. 1-3) as an oscillating circuit. With reference to FIG. 3, an embodiment will first be discussed in which all of the inductors 210a, 210b, 210c of the coil arrangement 200 of FIG. 1, i.e., the respective windings 212a, 212b and 212c, 212d and 212e, 212f combined, are supplied with current. In FIG. 3, the current flow 85 through the inductors 210a, 210b, 210c is plotted as a function of time. Such a current flow can be achieved by a commensurate alternating current voltage. As can be seen from FIG. 3, the alternating current voltages/ the current flow 85 have a phase difference of 120°—i.e., according to the angles 213a, 213b, 213c. The alternating current voltage 85 can be generated, for example, by a current-voltage converter which connects the coil arrangement 200 to a 12 V direct current line voltage of a motor vehicle. The alternating current voltage 85 can then be applied to the innermost and outermost contacts of an arm associated with the respective inductor 210a-210c.

Figure 4:
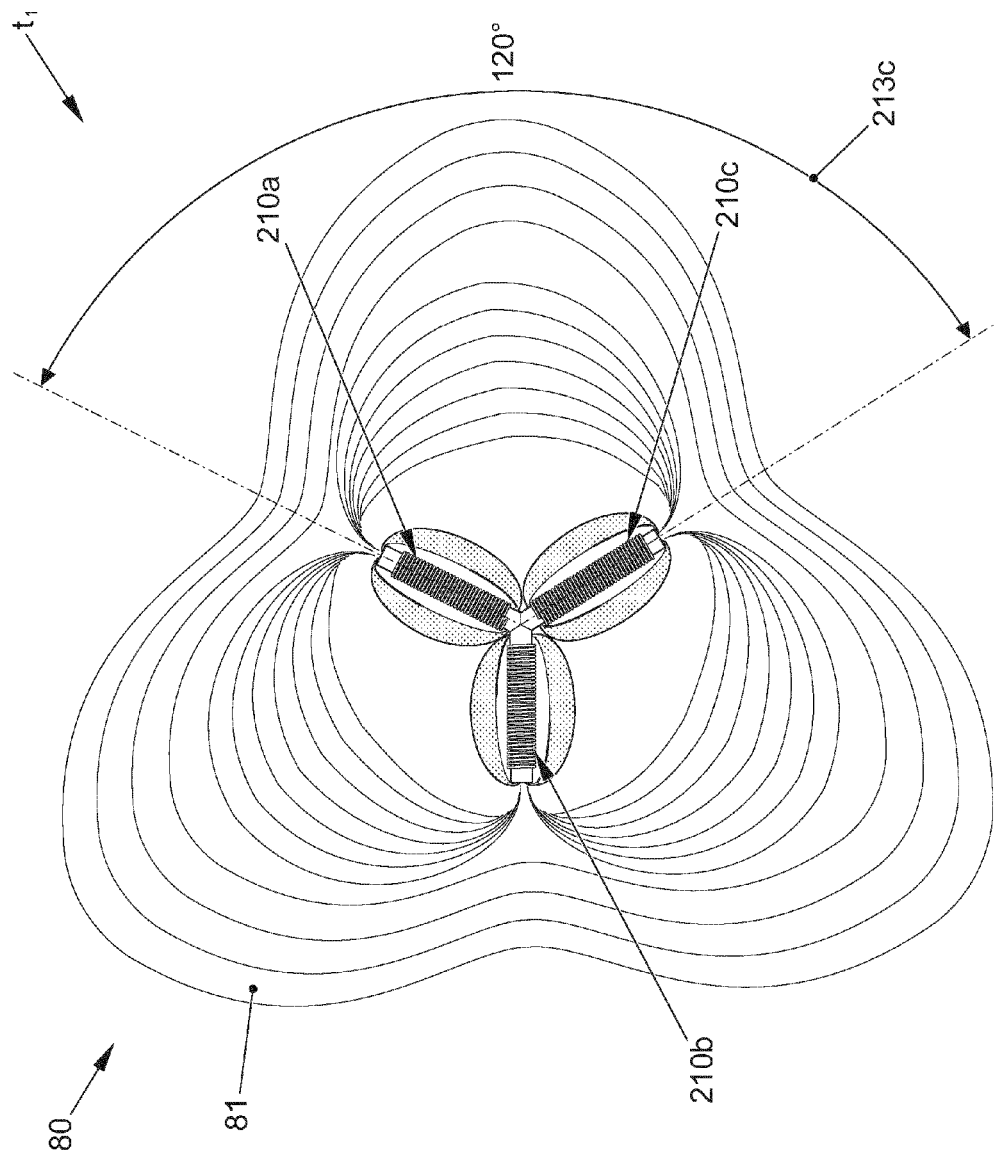
FIG. 4 shows an isocontour plot of the amplitude of the magnetic field component of the magnetic field generated by the coil arrangement of FIG. 1 at a certain point in time.

Such a provision of the inductors 210a, 210b, 210c with current brings about an electromagnetic field 80 as characterized by the amplitude 81 of the magnetic field component plotted in FIG. 4. FIG. 4 shows the EM field 80 at time point $t_1$. The electromagnetic field has a symmetry that corresponds to that of the coil arrangement. The plot of FIG. 4 represents the EM field 80 particularly within the coil plane.

It should be understood that it is also possible to generate an electromagnetic field 80 equal to that plotted in FIG. 4 using other configurations of the coil arrangement 200 that are different from that shown in FIG. 1. For example, if the angles 213a-213c of adjacent inductors 210a, 210b, 210c are different from the 120 of FIG. 1, the alternating current voltage 85, particularly a phase-shift, can be adapted accordingly (see FIG. 3). In this way, the change in the adjacent angles 213a, 213b, 213c can be compensated and a situation such as that shown in FIG. 4 can be maintained. The same applies if, as shown in FIG. 2, individual inductors 210c are tilted out of the coil plane. It can be possible here to account for the projection of the corresponding inductor 210c into the coil plane.

With reference to FIG. 5, the rotation of the EM field 80 as a function of time will be discussed below, i.e., the rotating EM field 80 will be explained. The EM field 80 is shown at four different time points t1, t2, t3, t4 (see also FIG. 3). Moreover, the phase 82 of the rotating EM field 80 is plotted below in FIG. 5. An increase in the phase 82 for increasing times is visible (phase accumulation). As can be seen from FIG. 5, the EM field 80 rotates within the coil plane around the coil arrangement 200. The coil plane is therefore coincident with the plane of rotation. While FIG. 5 shows a situation in which the EM field 80 has a constant amplitude as a function of the angle/phase, it is possible—for example, depending on the structural shape of the coil arrangement 200—for the amplitude 81 of the EM field 80 to also have a phase-dependence. The three-phase motor can be seen as a figurative analogy to the way the coil arrangement 200 operates in order to generate the rotating EM field 80.

In FIG. 6, a measurement of the amplitude 81 of the magnetic field component of the EM field 80 at a point P (see also FIG. 5) is plotted for the sake of example in the exterior space of the coil arrangement 200 and within the plane of rotation. Furthermore, FIG. 6 shows the amplitude 81 for a point P' (broken line) that is spaced apart from the plane of rotation and whose projection into the plane of rotation is coincident with the point P. The difference in amplitude 81 between the points P and P' is a measure for the distance of the point P' to the plane of rotation. The amplitude 81 is proportional to a field intensity of the EM field 80. As can be seen, the amplitude varies sinusoidally (solid line). It is possible to determine a differential phase 92 with respect to a reference phase 90. For example, the reference phase 90 can be transmitted with timing information 95 through modulation of the EM field 80.

For the modulation of the EM field 80, modulation techniques can be used which are selected from the following group: frequency modulation (FM), phase modulation (PM), "frequency shift keying" (FSK), "phase shift keying" (PSK), pulse amplitude modulation (PAM), and pulse code modulation (PCM). In general, other modulation techniques as are known in principle to a person skilled in the art are possible. It is also possible in principle to modulate the different components of the EM field 80 that are generated by the various inductors 201a, 210b, 210c using a different modulation technique and, particularly, modulation frequency.

In particular, the timing information 95 can also be transmitted through separate modulation of the EM field 80 emitted by the various inductors 201a, 210b, 210c. In other words, this can mean that the phase of the EM field 80 can be transmitted in a time-resolved manner. It can then be possible to already determine the differential phase 92 from the fraction of a complete rotation of the EM field 80, for instance from ⅓ or ⅔ of a rotation (in the case of 3 inductors with angles 213a, 213b, 213c of 120°).

It is possible to determine a position of a receiver through the operation of the individual coil arrangement 200. Here, "position" can refer to different informational depths: In particular, it is possible, for example, to determine the position in relation to an azimuth angle on the plane of rotation with respect to the coil arrangement 200 from the differential phase 92. According to various aspects, however, it is also possible to determine the position more accurately by using two or more coil arrangements; see FIG. 7A. "More accurately" can mean here that, besides the azimuth angle, a distance and/or a polar angle is determined in addition or alternatively. In different coordinate systems, the different coordinates can be represented differently.

It is also possible to determine the position not in a spherical coordinate system (distance, azimuth angle, polar angle), but rather in any other coordinate system. The position can particularly be determined in a reference coordinate system. The reference coordinate system can expediently be determined in relation to positions of the coil arrangement(s) 200 or, for example, in relation to a motor vehicle in which the coil arrangement(s) 200 is or are installed.

Figure 7A:
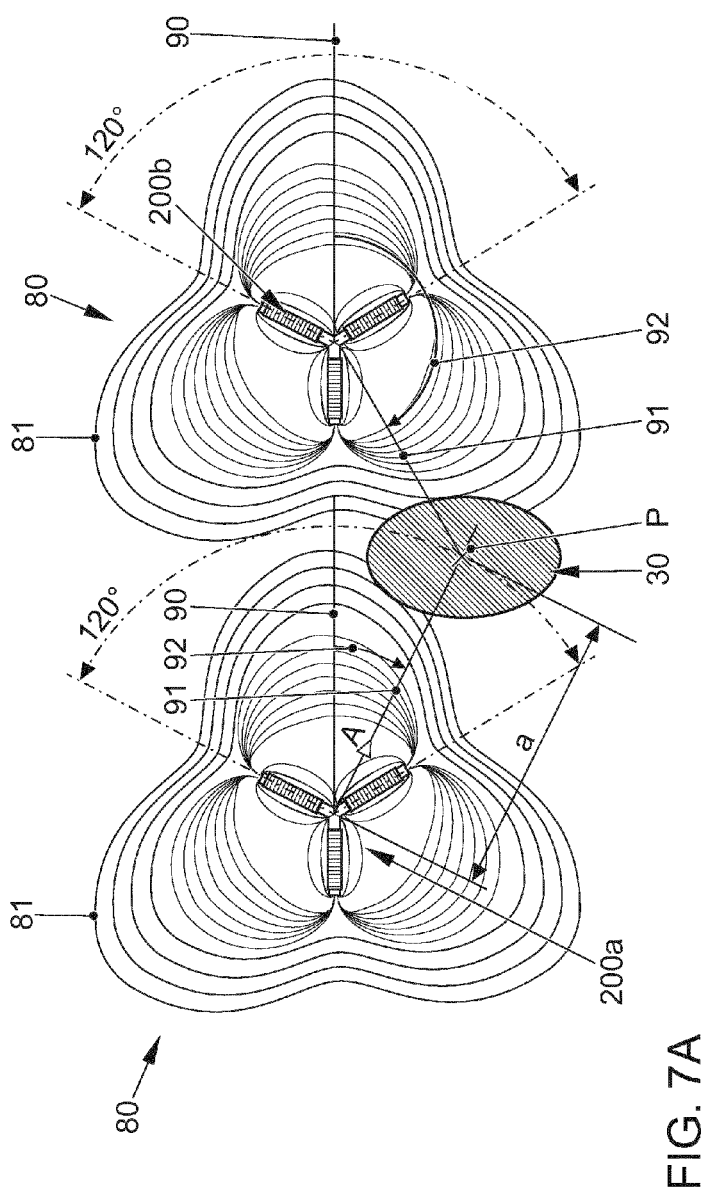
FIG. 7A shows a phase relationship for a certain position of the receiver with respect to the electromagnetic field generated by two coil arrangements, with FIG. 7A showing a top view of a plane of rotation on which the electromagnetic field rotates.

In FIG. 7A, two coil arrangements 200a, 200b are used for determining the position P of a receiver 30, e.g., of an identification transmitter such as a key of a motor vehicle, for example in the framework of a commensurate positioning system. The receiver 30 is set up to measure the rotating EM field 80 of the two coil arrangements 200a, 200b. For this purpose, the receiver can have one or more receiver coils (not shown in FIG. 7A), for example. The receiver is also set up to determine the differential phase 92 from that. As can be seen from FIG. 7A, the receiver 30 has different differential phases 91 with respect to the EM fields 80 of the two coil arrangements 200a, 200b. If both differential phases 92 are determined and the distance between the coil arrangements 200a, 200b is known, it is possible, for example, to determine the exact position of the receiver 30 within the plane of rotation of the EM fields 80 by means of triangulation. The position can be characterized by the direction A and the distance a with respect to the coil arrangement 200a, for example.

Figure 7B:
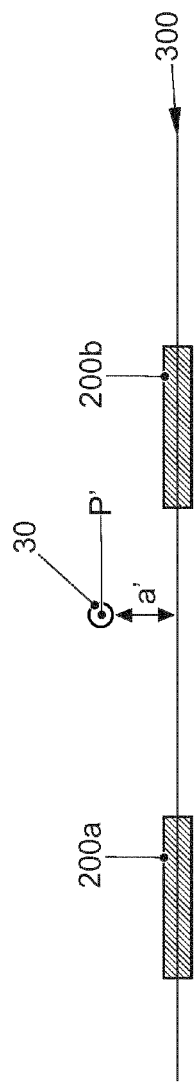
FIG. 7B shows a side view of FIG. 7A and illustrates a spacing of the receiver with respect to the plane of rotation of the rotating electromagnetic field.

It is possible to achieve even greater accuracy in the determination of the position P of the receiver 30: This can be achieved by measuring, in addition to the differential phases 92, a field intensity of the electromagnetic field 80 or a value proportional thereto by the receiver as well. To wit, through additional measurement of the field intensity, i.e., of the amplitude of the magnetic component of the electromagnetic field, for example, it can be possible to determine a vertical distance a' of the receiver 30 with respect to the plane of rotation. This is illustrated in FIG. 7B (side view of FIG. 7A) by the vertical arrow. Namely, if the receiver 30 is located at a position P' above or below the plane of rotation 300 of the rotating electromagnetic fields 80, then it is possible to clearly determine a projection of the receiver 30 into the plane of rotation 300 using the above-described triangulation based on the differential phases 92. Depending on the vertical spacing of the receiver 30 with respect to the plane of rotation 300, the field intensity of the EM field 80 can then be greater or less (see broken line in FIG. 6).

If, in addition to the two coil arrangements 200a, 200b, yet other coil arrangements are used, then an uncertainty in the position determination can be reduced; for example, an error in the triangulation can be determined. While above in relation to FIGS. 7A and 7B techniques for determining the position of the receiver 30 in relation to two coil arrangements 200a, 200b were discussed above, it should be understood that it is generally possible to use more than two coil arrangements 200a, 200b. For example, if three, four or five coil arrangements are used, it can be possible to reduce an error in the determination of the position of the receiver 30. The several EM fields 80 can be emitted sequentially or one after the other at different time points (time multiplexing) or simultaneously at least in part at different frequencies (frequency multiplexing). As a result, the receiver 30 can correlate the respectively measured EM field 80 with one of the coil arrangements 200a, 200b.

Figure 8A:
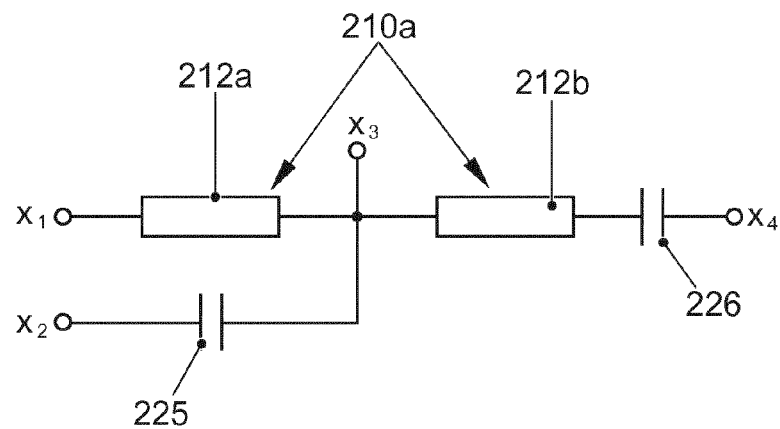
FIG. 8A shows an electrical circuit of an inductor comprising two coil windings and two capacitors.

FIG. 8A shows an electrical connection of the inductor 210a. Visible in particular are the two coil windings 212a, 212b. The two coil windings 212a, 212b can be operated in a coupled manner through contacting with the contacts x1 and x4 (see also FIG. 1). A capacitor 226 is connected in series with the two coil windings 212a, 212b. It is also possible, however, to operate the coil windings 212a alone. Another capacitor 225 is provided for this purpose that is connected in parallel with the coil winding 212a.

In the event that the coil windings 212a, 212b are operated in a coupled manner, an inductance of the inductor 210a is greater than in the event that only the coil winding 212a is operated. For that reason, a resonance frequency can be lower for the former case than a resonance frequency for the latter case. For example, if the inductor 210a with the two coil windings 212a, 212b through appropriate dimensioning of the inductances and capacitance of the capacitor 226, the resonance frequency can be selected such that it is 125 kHz. Accordingly, a resonance frequency for an operation inductor 210a that merely comprises the coil winding 212a and the other capacitor 225 can be selected so as to be equal to 1 MHz. Of course, it is possible to produce other frequencies through the appropriate dimensioning of the capacitances and inductances. Many techniques for this are known to a person skilled in the art.

In general, the power consumption can be greater for the emission of the EM field for the series connection with capacitor 226 than for the parallel connection with the other capacitor 225. In certain applications, for instance when searching for a receiver in the surroundings in the remote range, the control of the parallel circuit with the other capacitor 224, preferably at 1 MHz, can include a non-rotating EM field, for example. Such a scenario is characterized by low electrical power consumption, which can be preferable, for example, for proximity detection in broad surroundings, i.e., for long ranges of up to 10 m from the motor vehicle 1. If the identification transmitter 30 is detected in these remote surroundings, then the series connection with the capacitor 226 can be activated. In this operating mode, the position and the positional profile of the identification transmitter 30 in the near range, for example up to 3 m from the motor vehicle 1, can be determined. Such a hierarchical operation can result in lower power consumption, which can be desirable particularly in electrical vehicles.

Figure 8B:
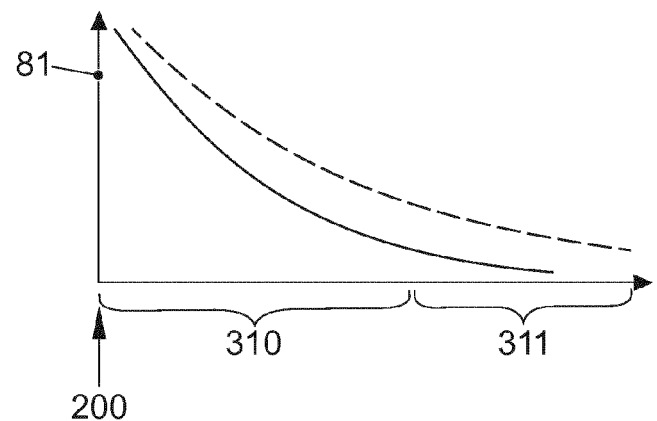
FIG. 8B shows a decay rate of the field intensity of the electromagnetic field for different operating modes of the electrical circuit of FIG. 8A and for different frequencies.

In a frequency range which includes the abovementioned frequencies, a decay rate of the electromagnetic field 80 can be frequency-dependent. Higher frequencies can bring about a lower decay rate of the electromagnetic field 80. This is shown in FIG. 8B. In FIG. 8B, the amplitude 81 of the magnetic component of the electromagnetic field 80, for instance, is plotted over the place as a distance with respect to the emitting coil arrangement 200. The solid (broken) line illustrates the case of a relatively low (high) resonance frequency of the corresponding oscillating circuit, as discussed above in relation to FIG. 8A. As can be seen from FIG. 8B, a decay rate of the electromagnetic field 80 is lower for higher resonance frequencies. For this reason, it can be possible to perform a determination of the position of the receiver 30 in a remote range 311 (near range 310) of the coil arrangement 200 by supplying only one (both) coil winding(s) 212a (212a, 212b) with current.

Figure 8C:
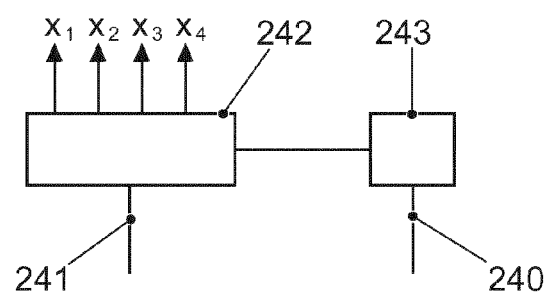
FIG. 8C shows a schematic view of an alternating current voltage source that is connected to an on-board electrical system and the inductors of the coil arrangement.
Figure 9A:
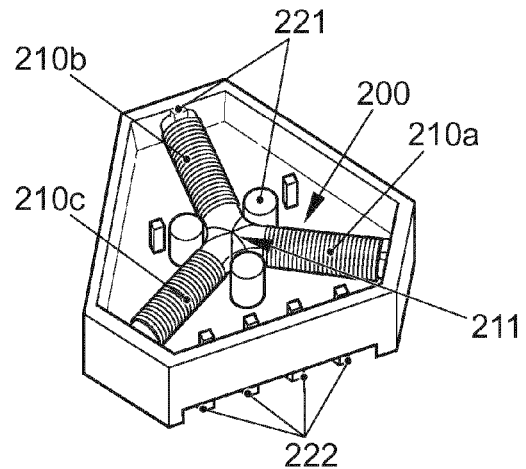
FIG. 9A shows a perspective view of the coil arrangement of FIG. 1 in a housing.
Figure 9B:
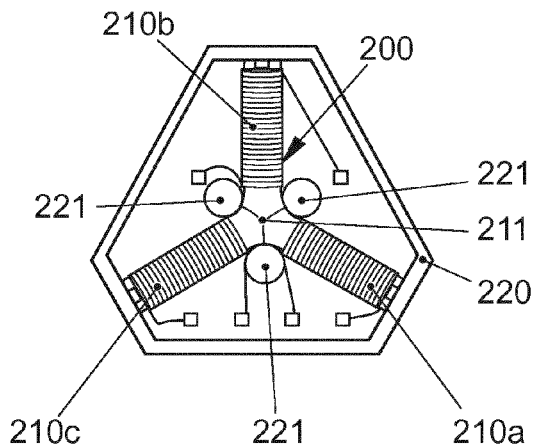
FIG. 9B shows a plan view from above of the coil arrangement with housing of FIG. 9A.
Figure 9C:
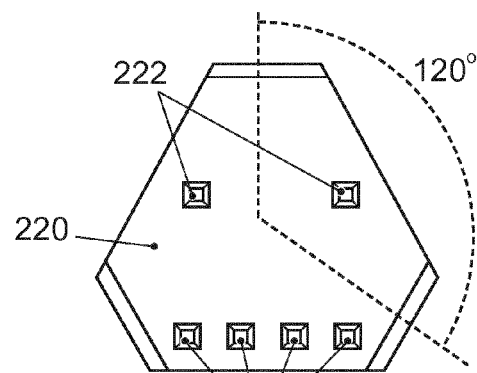
FIG. 9C shows a plan view from below of the coil arrangement with housing of FIG. 9A.
Figure 9D:
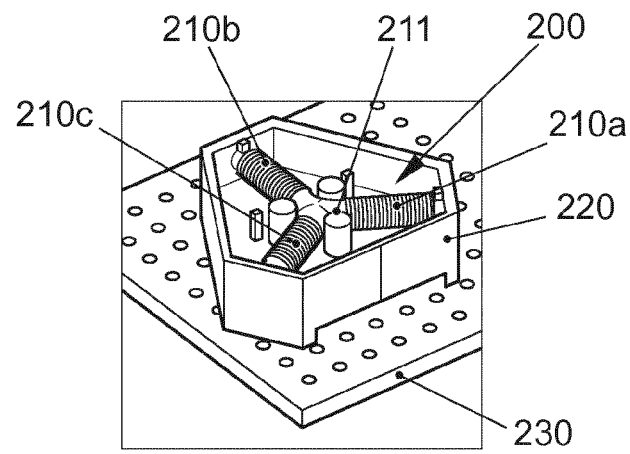
FIG. 9D shows a perspective view of the coil arrangement of FIG. 9A, the coil arrangement being attached to a printed circuit board.
Figure 9E:
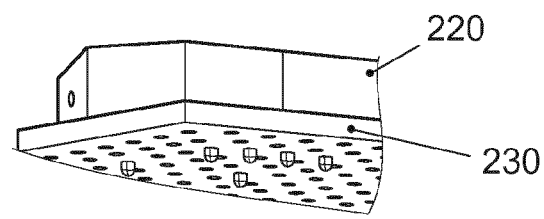
FIG. 9E shows another perspective view of the coil arrangement of FIG. 9A, the coil arrangement being attached to a printed circuit board.
Figure 9F:
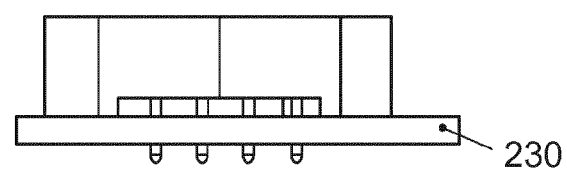
FIG. 9F shows a side view of the coil arrangement of FIGS. 9D and 9E.
Figure 10A:
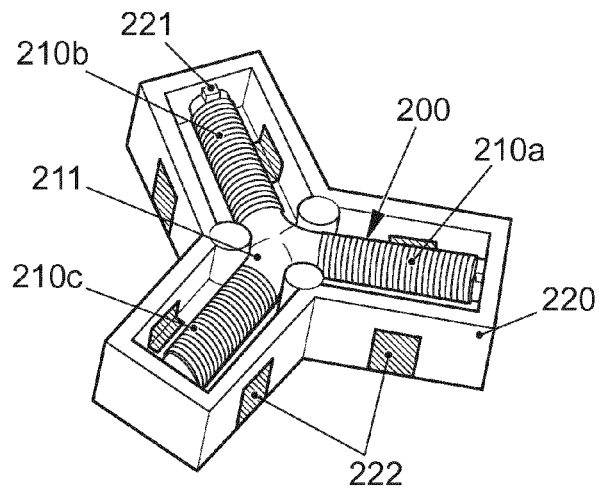
FIG. 10A shows a perspective view of the coil arrangement of FIG. 1 in an alternative embodiment of the housing.
Figure 10B:
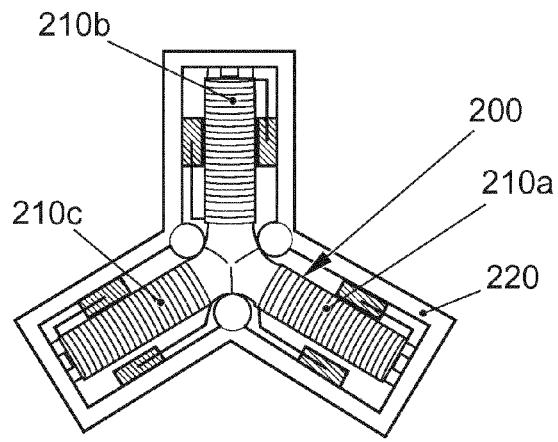
FIG. 10B shows a plan view from above of the coil arrangement with the alternative embodiment of the housing of FIG. 10A.
Figure 10C:
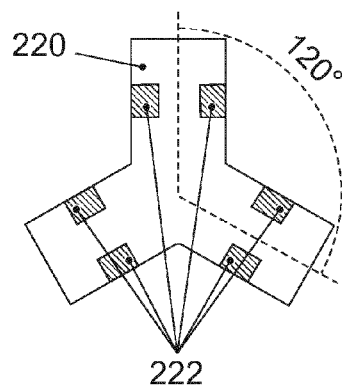
FIG. 10C shows a plan view from below of the coil arrangement with the alternative embodiment of the housing of FIG. 10A.
Figure 10D:
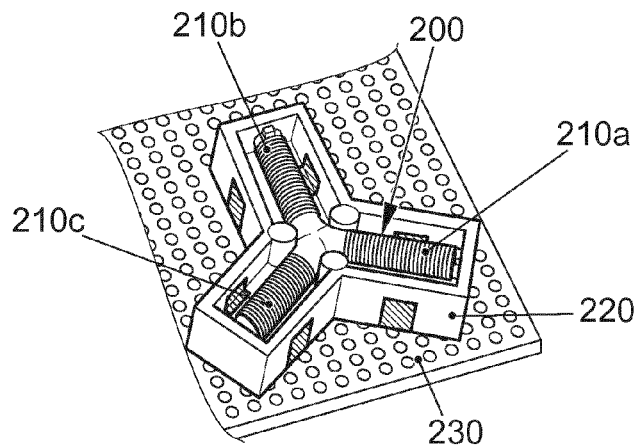
FIG. 10D shows a perspective view of the coil arrangement of FIG. 1 with the alternative embodiment of the housing, the coil arrangement being attached to a printed circuit board.
Figure 10E:
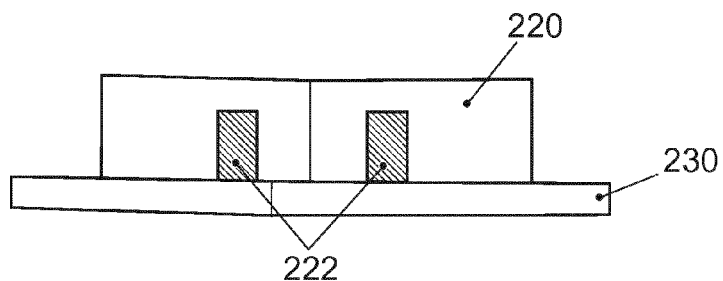
FIG. 10E shows a side view of the coil arrangement of FIG. 1 with the alternative embodiment of the housing, the coil arrangement being attached to a printed circuit board.

A current-voltage source 242 connected to a supply line 241 is shown schematically in FIG. 8C. The supply line 241 can be a 12 V direct current line voltage of a motor vehicle, for example. The alternating current voltage source 241 is set up to generate an alternating current voltage as shown in FIG. 3. Furthermore, FIG. 8C shows a processor unit 243 that is set up to receive control signals via a bus system 240 and control the emission of the EM field 80 on the basis of that.

FIGS. 9A-9F and 10A-10D show various views of the coil arrangement 200 from FIG. 1 in a housing 220. The capacitors 225, 226 and other power electronics can also be arranged outside of the housing. Electrical contacts 222 are shown which can connect the coil arrangement to conductor paths on a printed circuit board 230. For example, the contacts can be connected to the alternating current voltage source 242 via conductor paths on the printed circuit board. Moreover, supports 221 are provided which fix the coil arrangement 200 in a stationary manner within the housing 220. The housing can constitute protection against vibrations, deposits, moisture, etc. and can preferably be made of plastic. An upper side of the housing 220 is not shown for the sake of clarity but can be provided. As can be seen from FIGS. 9A-9F and 10A-10D, an upper and underside of the housing as well as the printed circuit board 230 can be parallel to the plane of rotation 300 or the coil plane. The special shape of the housing is not limiting and can vary. It should be understood that, depending on the installation space that is available, different housings 220 can be preferred. The housing can be mounted so as to be parallel to the ground.

Figure 11:
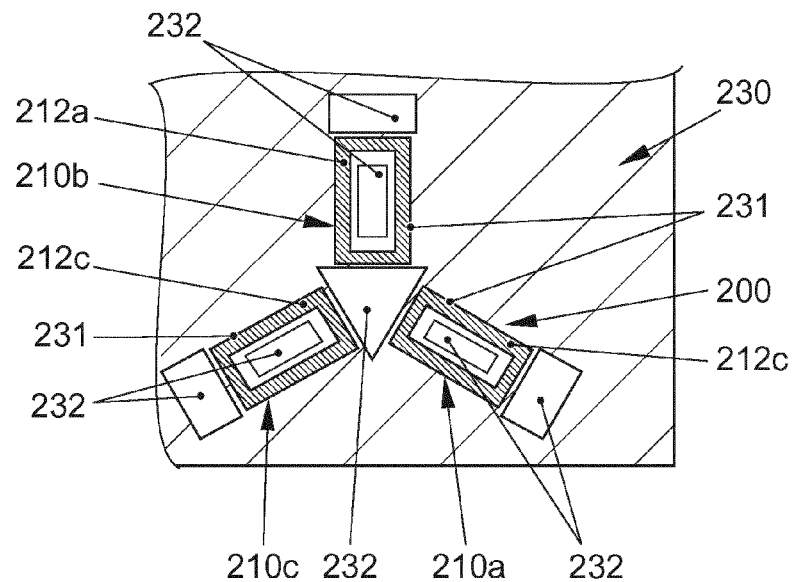
FIG. 11 shows a top view of an embodiment of the coil arrangement integrated onto a printed circuit board in which the inductors are embodied by conductor paths.

FIG. 11 shows an alternative embodiment of the coil arrangement 200. This embodiment corresponds to an integrated design in which the conductor paths 231 form the coil windings 212a, 212c, 212e in a planar manner on a printed circuit board 230 (broken line). The conductor paths can be produced, for example, through etching or mask or lithography techniques.

Recesses 232 of the printed circuit board 230 are provided into which the coil yoke 211 (not shown in FIG. 11) can be inserted and fixed. This embodiment can have the effect of a very small space requirement.

A system architecture of a positioning system 100 will be explained below with reference to FIGS. 12-14 which comprises at least two coil arrangements 200, 200a, 200b. Using techniques such as those described above in relation to FIGS. 7A and 7B, the positioning system 100 can precisely determine the position of the receiver 30, for example of a key in relation to a motor vehicle. The localization can be done with relative accuracy—down to a few centimeters, for example—both on the exterior and on the interior of the motor vehicle. For example, the determined position of the key can be represented graphically for the user, for instance on a screen of an on-board computer of the motor vehicle 1. Rotating EM fields can be generated for this purpose.

Figure 12:
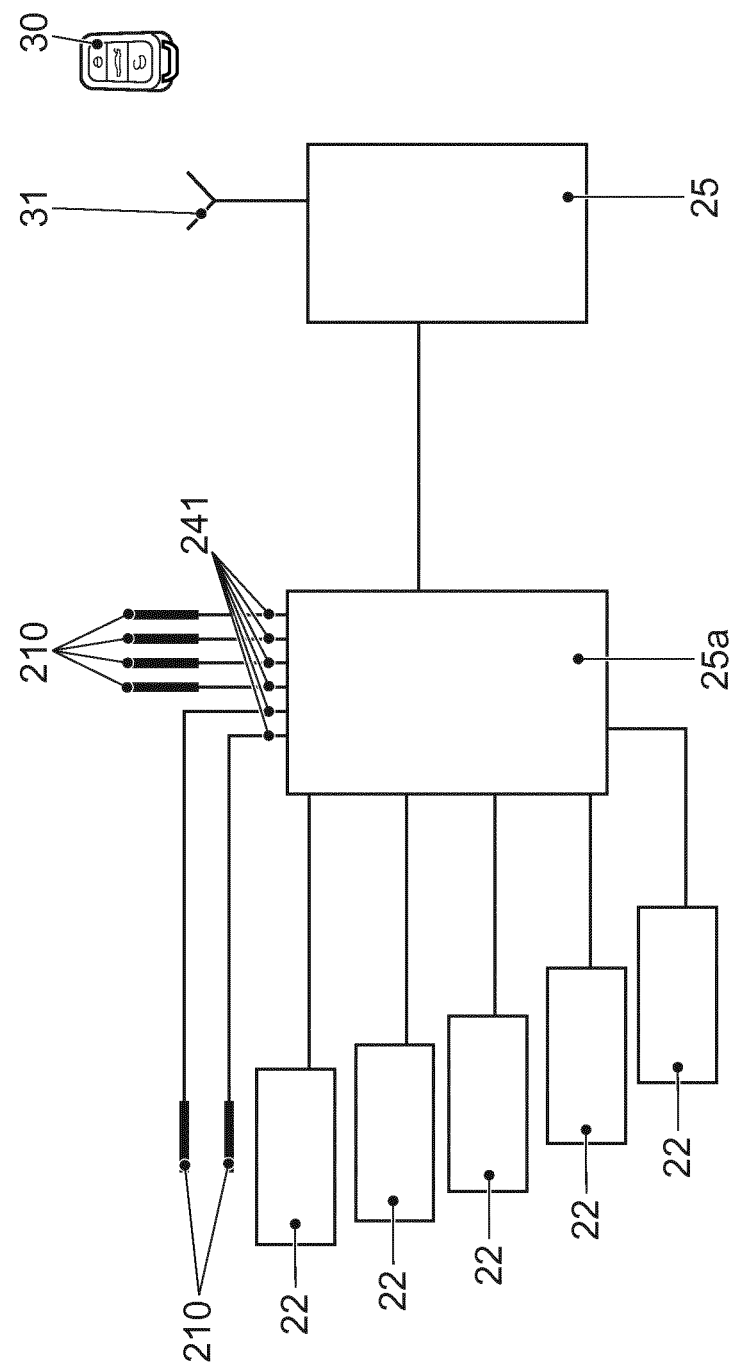
FIG. 12 shows a schematic view of a previously known positioning system for an identification transmitter of a motor vehicle.

FIG. 12 shows a previously known positioning system 100. A control device 25 is connected to another control device 25a. For example, the control device 25 can be parts of a central processor unit of the motor vehicle. Moreover, the control device 25 is connected to a radio interface 31 which can produce data transmission with the identification transmitter 30. The other control device 25A is connected via data lines to door handle sensors 22 of the motor vehicle. These door handle sensors 22 can detect actuation or a desire to access the closing flaps of the motor vehicle, such as doors and hatch doors. Moreover, the other control device 25a is connected via supply lines 241 to individual inductors 210 for generating electromagnetic fields that can be measured by the identification transmitter 30. As can be seen from FIG. 12, the system architecture of the previously known positioning system is relatively elaborate. In particular, the two-wire supply lines 241 must be provided in great number, for example, which makes complicated cabling of the vehicle necessary: The control device 25a comprises an alternating current voltage source that supplies the inductors 210 with power via the line 241a.

Figure 13:
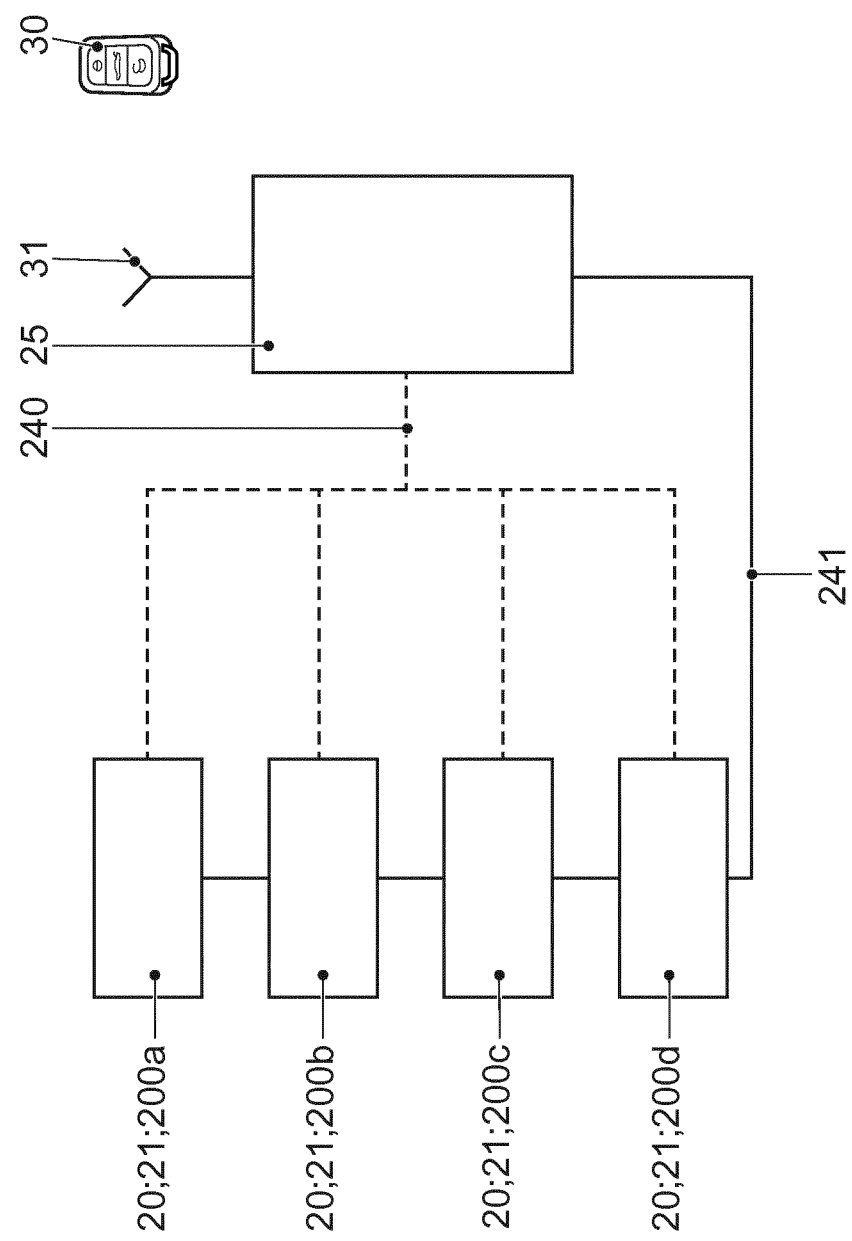
FIG. 13 shows a schematic view of a positioning system according to the invention for an identification transmitter of a motor vehicle.

FIG. 13 shows a schematic view of the positioning system 100 according to the invention.

Four coil arrangements 200a-200d, as well as capacitive sensors 20 and optical sensors 21 are provided. The coil arrangements 200a-200d can be connected via a processor unit (not shown in FIG. 13) to a bus system 240 which enables data communication with the control device 25. The bus system can be a "controller area network" (CAN) bus system, "local interconnect network" (LIN), or "FlexRay" or other bus system, for example. The control device 25 can receive commands via the bus system 240 which are received and interpreted by the processor unit of the respective coil arrangement 200a-200d. Then the coil arrangements 200a-200d are set up to generate a respective rotating EM field 80 in response to the control signals. The power required for this can be obtained from the supply line 241. For example, the supply line can make direct voltage available (12 V, for instance), so that a commensurate electrical switching circuit, i.e., an alternating current voltage source, is set up in the coil arrangements 200a-200d in order to produce the alternating current voltage required to generate the EM field 80 from it with the predetermined phase relationship. For example, the control unit 25 can control the coil arrangements 200a-200d such that the respective EM fields 80 are emitted at different times (time multiplexing) and/or at different frequencies (frequency multiplexing). Using the techniques as described in relation to FIGS. 7A and 7B, a position of the receiver 30 can then be determined. The positioning system 100 of FIG. 13 can have a faster reaction time compared to the system of FIG. 12, because the interposed control device 25a is omitted.

Figure 14:
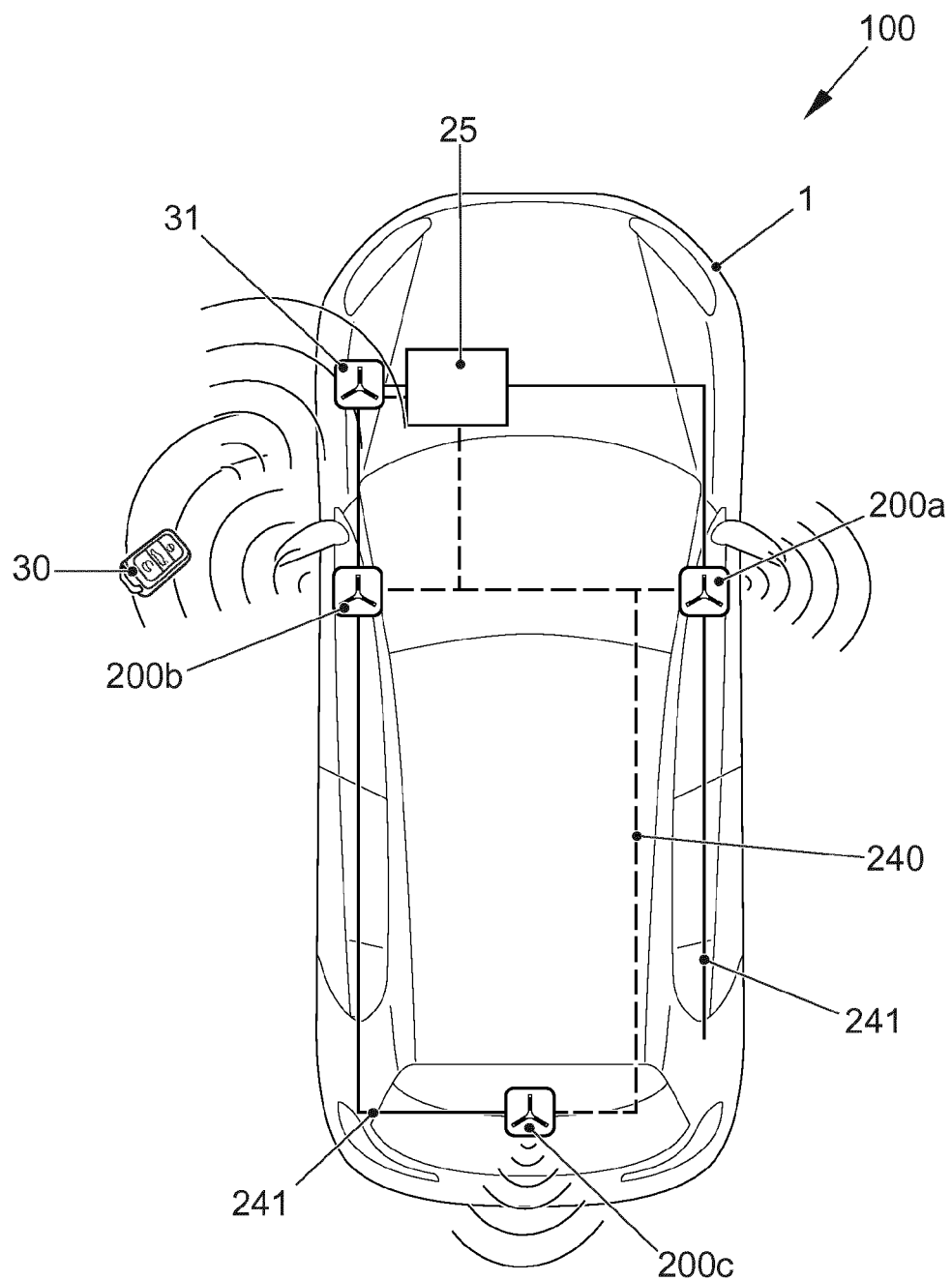
FIG. 14 shows a structural layout of the positioning system of FIG. 13 in the motor vehicle.

FIG. 14 shows the positioning system 100 with an arrangement in the motor vehicle 1. It can also be seen from FIG. 14 that control and power supply occurs through the separated lines 240, 241. In of FIG. 14 the coil arrangements 200a, 200b are installed in the right and left front doors. It would also be possible to install the coil arrangements 200a, 200b in the left- and right-side B-columns and/or C-columns. Other coil arrangements can be provided in a modular manner, for instance in the area of the rear of the vehicle.

Figure 15:
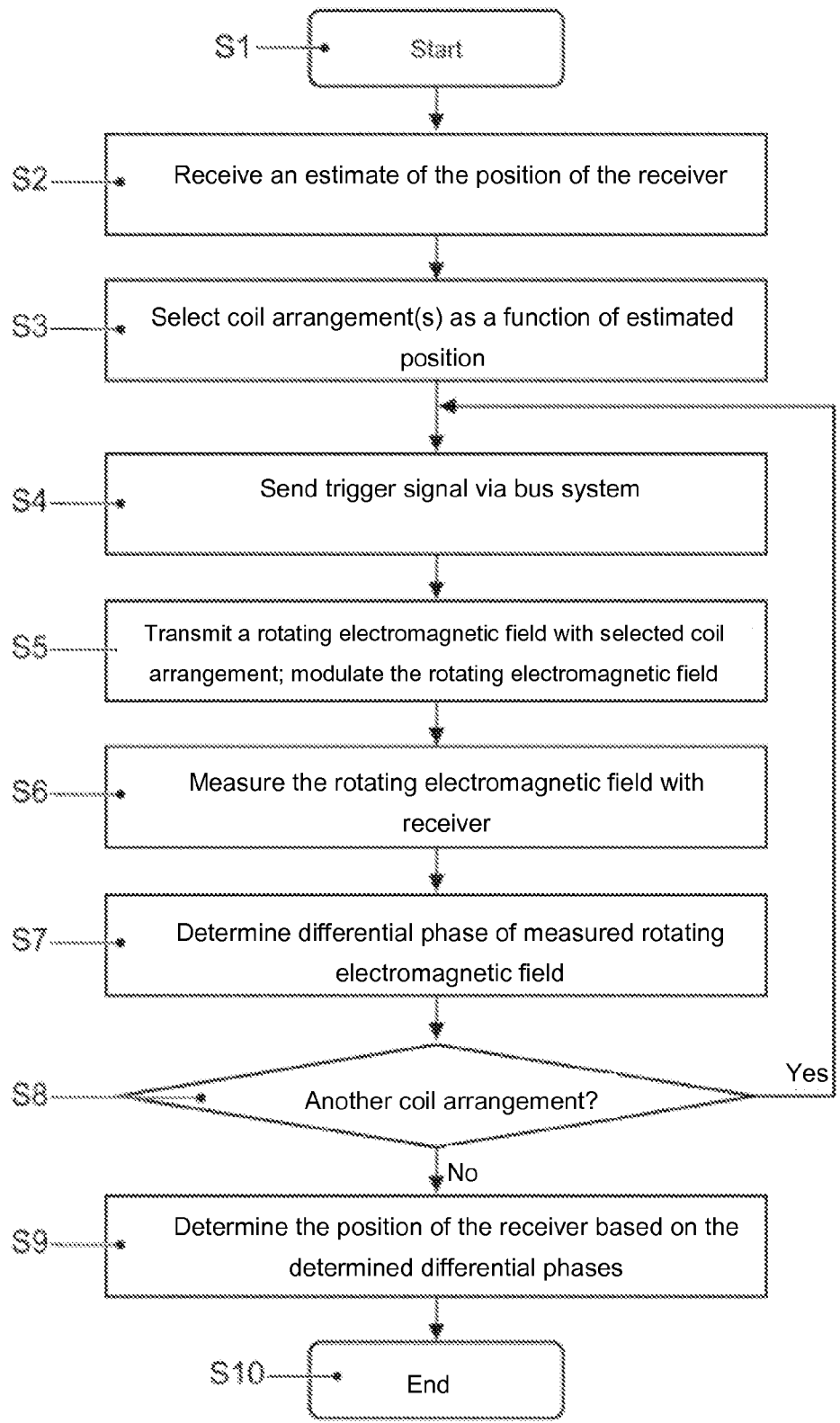
FIG. 15 shows a flowchart of a method for determining a position of a receiver.

FIG. 15 shows a flowchart of a method for determining a position of a receiver. The method begins with step S1. For example, the beginning of the method can be triggered by an external trigger signal; such a trigger signal can be the actuation of a door handle or a proximity detection, for example. First, in step S2, an estimation of the position of the receiver 30 is received. For example, an estimation of the position of the receiver 30 can be performed via the optical and/or capacitive sensors 20, 21 that are provided in the door handles of the motor vehicle 1 (see also FIG. 13). The estimation of the position of the receiver 30 can therefore contain an informational depth such as, for example: "receiver 30 is located to the front-left with respect to the motor vehicle 1" or "receiver 30 is located behind the motor vehicle 1."

This is followed, in step S3, by the selection of the coil arrangement or of the coil arrangements that are to subsequently emit the rotating EM field 80, depending on the estimated position in step S2. For example, if it known from step S2 that the receiver 30, as shown in FIG. 14, is located to the front-left next to the motor vehicle 1, then the coil arrangements 200b and 200c can be selected, for example; this is the case, because, for a triangulation based on differential phases (as described above in relation to FIGS. 7A and 7B), the information gain through the determination of the differential phase by means of the coil arrangement 200a is low compared to the coil arrangement 200b due to the small difference in angle to the receiver 30. Alternatively, it would also be possible, for example, to operate all three coil arrangements 200a-200c or only the coil arrangement 200b, etc. In step S4, a trigger signal is transmitted via the bus system to one of the coil arrangements 200a-200c selected in step S3. This current coil arrangement then transmits the rotating electromagnetic field 80. The rotating electromagnetic field 80 is generated by the corresponding coil arrangement 200a-200c in such a way that it contains, through modulation, both information on the identification of the motor vehicle 1 and timing information 95. For example, the timing information can include a reference phase with respect to which the differential phases are determined. It would also be possible to determine the differential phases with respect to the trigger signal from step S1. The emission of the rotating electromagnetic field 80 can be achieved by applying several phase-shifted alternating current voltages 85 to the various inductors 210a-210c of the respective coil arrangement 200a-200c and superposing the corresponding EM fields.

The measurement of the electromagnetic field 80 is done in step S6. As a result, steps S5 and S6, for example, can be carried out at the same time. The measurement in step S6 can comprise, for example, the time-/frequency-resolved inductive measurement of the amplitude 81 of the magnetic field component. In step S7, the differential phase 92 of the measured electromagnetic field 80 is determined. For example, step S7 can be carried out on a processor unit within the receiver 30. It is also possible, however, for the information on the measured rotating electromagnetic field 80 from step S6 to be transmitted via the radio interface 31 to the control unit 25, so that the latter can perform step S7. In step S8, a check is performed as to whether the emission and measurement of another electromagnetic field 80 by another coil arrangement 200*a*-200*c* is required. If that is the case, steps S4-S7 are repeated. Otherwise, the determination of the position of the receiver on the basis of the determined differential phases 92 is made in step S9. Step S9 can include triangulation, for example. Step S9 can be carried out in a processor unit within the control device 25 or in the receiver 30, for example. The method ends in step S10.

While a technique was described above in which the separate trigger signals are used in step S4 for controlling the various coil arrangements 200*a*-200*c*, it would also be possible to carry out step S4 only once and to already include in the single emitted trigger signal all of the information about which coil arrangement 200*a*-200*c* is to generate the electromagnetic field 80. In such a case, the trigger signal could initiate timers in the respective coil arrangements 200*a*-200*c*; the timers would be configured such that the various coil arrangements 200*a*-200*c* emit the electromagnetic field 80 at different time points.

Furthermore, it would be possible, in addition to the time multiplexing described above, to also perform techniques of frequency multiplexing and to emit the various EM fields 80 simultaneously at least in part.

Moreover, it should be understood that step S9 can involve a different accuracy in the determination of the position P, P' of the receiver 30: For example, it can be possible, if only one rotating electromagnetic field 80 is emitted and measured (steps S5 and S6), for only the position P, P' of the receiver to be determined as an angle or direction A with respect to the corresponding coil arrangement 200*a*-200*c*. However, if two or more rotating electromagnetic fields 80 are used, the position P, P' of the receiver can be determined precisely within the plane of rotation 300 of the electromagnetic fields 80: This can include, particularly, the distance a to a coil arrangement 200*a*-200*c*. Optionally, it would be possible in step S6 to measure the field intensity of the rotating electromagnetic field 80, i.e., the amplitude 81 of the magnetic component of the electromagnetic field 80, for example, and deduce from that a distance a' of position P' of the receiver 30 to the plane of rotation in step S9 (see broken line in FIG. 6). In particular, an embodiment of the coil arrangement 200 can be used for this purpose, for example, in which the single or several inductors 210*a*, 210*b*, 210*c* are tilted with respect to the coil plane; such a case is illustrated in FIG. 2, for example. Such a configuration can offer the advantage, for example, that positions with equal spacing with respect to the plane of rotation but which are arranged above or below (i.e., in a mirror-symmetrical manner in relation to the plane of rotation), different field intensity values are measured. In this way, it can be determined whether the receiver 30 is located above or below the plane of rotation.

Although the invention has been illustrated and described in further detail by the preferred embodiments with reference to the figures, the invention is not limited by the disclosed examples, and a person skilled in the art can derive other variations herefrom without going beyond the scope of protection of the invention. For example, it is possible to apply the above-described techniques used for the position determination of a key of a motor vehicle to person localization systems. Typical applications would be, for example, the localization of people and objects bearing a receiver for evaluating the phase information. All radio techniques, including Bluetooth©, wireless LAN (WLAN), radio frequency identification (RFID) and others are possible for the transmitter.

For example, it would also be possible to use the positioning system 100 for various applications that enable the motor vehicle 1 to be controlled through the precise determination of the position of the key 30 through motion detection of the key 30. A left-right motion of the key could bring about a left-right turning of the motor vehicle 1, for example. The user could be located outside of the motor vehicle 1 and drive it remotely.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a position of a receiver, the method comprising:
    emitting at least one electromagnetic field by a respective transmitter, wherein an amplitude of the at least one electromagnetic field rotates respectively as a function of time on a plane of rotation around the respective transmitter;
    measuring the at least one electromagnetic field by the receiver;
    determining a differential phase for each of the at least one electromagnetic field at the position of the receiver based on the measured at least one electromagnetic field; and
    determining the position of the receiver based on the at least one determined differential phase,
    wherein the respective transmitter includes at least three inductors arranged on the plane of rotation for the emission of the at least one electromagnetic field.

2. The method as set forth in claim 1, wherein the emission occurs sequentially for two or more electromagnetic fields, wherein the measurement occurs sequentially for the two or more electromagnetic fields, wherein the determination of the position of the receiver based on a triangulation is performed for the at least two differential phases, and wherein the determination of the position of the receiver comprises the determination of a direction and a distance at which the receiver is arranged on the plane of rotation of the electromagnetic field with respect to at least one of the transmitters.

3. The method as set forth in claim 1, wherein the emission and the measurement are performed for an individual electromagnetic field, and wherein the determination of the position of the receiver comprises the determination of a direction at which the receiver is arranged on the plane of rotation of the electromagnetic field with respect to at least one of the transmitters.

4. The method as set forth in claim 1, further comprising receiving an estimation of the position of the receiver, wherein the emission of the at least one electromagnetic field takes the estimation of the position into account.

5. The method as set forth in claim 2, wherein, depending on the estimation of the position of the receiver, the emission occurs either sequentially for the two or more electromagnetic fields or for the individual electromagnetic field.

6. The method as set forth in claim 1, further comprising determining a field intensity for the at least one electromagnetic field at the position of the receiver based on the measured at least one electromagnetic field, wherein the determination of the position of the receiver comprises the determination of a distance of the receiver to the plane of rotation of the electromagnetic field based on the determined field intensity.

7. The method as set forth in claim 1, further comprising modulating the at least one electromagnetic field for the transmission of information to the receiver, wherein the information comprises elements including timing information of a reference phase and/or identifying information of the at least one transmitter.

8. A method for determining a position of a receiver, the method comprising:
   emitting at least one electromagnetic field by a respective transmitter, wherein an amplitude of the at least one electromagnetic field rotates respectively as a function of time on a plane of rotation around the respective transmitter;
   measuring the at least one electromagnetic field by the receiver;
   determining a differential phase for each of the at least one electromagnetic field at the position of the receiver based on the measured at least one electromagnetic field; and
   determining the position of the receiver based on the at least one determined differential phase;
   emitting at least one other electromagnetic field by a respective transmitter, the at least one other electromagnetic field having a frequency that is greater than a frequency of the at least one electromagnetic field;
   measuring the at least one other electromagnetic field by the receiver; and
   determining a field intensity for each of the at least one other electromagnetic field at the position of the receiver based on the measured at least one other electromagnetic field; and
   determining a distance of the receiver to the at least one transmitter based on the at least one detected field intensity,
   wherein the determination of the distance of the receiver is performed based on the at least one detected field intensity for determining the position of the receiver in a remote range to the at least one transmitter, wherein the determination of the position of the receiver is performed based on the at least one determined differential phase for determining the position of the receiver in a near range to the at least one transmitter, and wherein the emission and the measurement of the at least one electromagnetic field as well as the determination of the differential phase for each of the at least one electromagnetic field and the determination of the position of the receiver are performed selectively based on the at least one determined differential phase in consideration of the determination of the distance of the receiver.

9. The method as set forth in claim 1, wherein the emission of the at least one electromagnetic field respectively comprises:
   phase-shifted supplying of current to the at least three inductors of the at least one transmitter arranged on the plane of rotation of the electromagnetic field; and
   the phase-shifted supplying of current taking into account a structurally predetermined angle arrangement of the at least three inductors on the plane of rotation so that a rotational frequency of the electromagnetic field is equal to a frequency of the electromagnetic field.

10. The method as set forth in claim 1, wherein the emission of the at least one electromagnetic field is triggered by a trigger signal transmitted by a control device.

11. The method as set forth in claim 1, wherein the receiver is moveable with respect to the at least one transmitter, wherein the at least one transmitter is connected to a control device, and the method further comprises wirelessly transmitting the determined differential phase and/or of the determined position from the moveable receiver to the control device.

12. A positioning system for a receiver, the positioning system comprising:
   at least one transmitter that is respectively set up to emit an electromagnetic field, an amplitude of the electromagnetic field rotating as a function of time on a plane of rotation around the transmitter;
   the receiver that is set up to measure the at least one electromagnetic field, and
   a processor unit that performs the steps:
      determining a differential phase for each of the at least one electromagnetic field at the position of the receiver based on the measured at least one electromagnetic field; and
      determining the position of the receiver based on the at least one determined differential phase,
   wherein the at least one transmitter includes at least three inductors arranged on the plane of rotation for the emission of the electromagnetic field.

13. The positioning system as set forth in claim 12, wherein for determining a position of a receiver a method comprises:
   emitting at least one electromagnetic field by a respective transmitter, wherein an amplitude of the at least one electromagnetic field rotates respectively as a function of time on a plane of rotation around the respective transmitter;
   measuring the at least one electromagnetic field by the receiver;
   determining a differential phase for each of the at least one electromagnetic field at the position of the receiver based on the measured at least one electromagnetic; and
   determining the position of the receiver based on the at least one determined differential phase.

14. An automobile comprising a positioning system for a receiver, the positioning system comprising:
   at least one transmitter, each of which is set up to emit a time-dependent electromagnetic field, wherein an amplitude of the electromagnetic field rotates as a function of time on a plane of rotation around the transmitter; and
   the receiver, which is set up to measure the at least one time-dependent electromagnetic field; and
   a processor unit that is set up to carry out the steps:
      determining a differential phase for each of the at least one electromagnetic field at the position of the receiver based on the measured at least one time-dependent electromagnetic field; and
      determining the position of the receiver based on the at least one determined differential phase,
   wherein the at least one transmitter includes at least three inductors arranged on the plane of rotation for the emission of the electromagnetic field.

15. The positioning system as set forth in claim 12, wherein the emission of the at least one electromagnetic field respectively comprises:
   phase-shifted supplying of current to the at least three inductors of the at least one transmitter arranged on the plane of rotation of the electromagnetic field; and the phase-shifted supplying of current taking into account a structurally predetermined angle arrangement of the at least three inductors on the plane of rotation so that a rotational frequency of the electromagnetic field is equal to a frequency of the electromagnetic field.

16. The automobile as set forth in claim 14, wherein the emission of the at least one electromagnetic field respectively comprises:

phase-shifted supplying of current to the at least three inductors of the at least one transmitter arranged on the plane of rotation of the electromagnetic field; and the phase-shifted supplying of current taking into account a structurally predetermined angle arrangement of the at least three inductors on the plane of rotation so that a rotational frequency of the electromagnetic field is equal to a frequency of the electromagnetic field.

* * * * *